United States Patent
Brar et al.

(10) Patent No.: US 9,118,604 B2
(45) Date of Patent: Aug. 25, 2015

(54) METHOD AND SYSTEM FOR ROUTING PACKETS

(71) Applicants: Jagwinder Singh Brar, Bellevue, WA (US); Ariff Premji, Redmond, WA (US)

(72) Inventors: Jagwinder Singh Brar, Bellevue, WA (US); Ariff Premji, Redmond, WA (US)

(73) Assignee: Arista Networks, Inc., Santa Clara, CA (US)

( * ) Notice: Subject to any disclaimer, the term of this patent is extended or adjusted under 35 U.S.C. 154(b) by 71 days.

(21) Appl. No.: 14/100,727

(22) Filed: Dec. 9, 2013

(65) Prior Publication Data

US 2015/0131654 A1    May 14, 2015

Related U.S. Application Data

(63) Continuation of application No. 14/080,193, filed on Nov. 14, 2013.

(51) Int. Cl.
| | |
|---|---|
| *H04L 12/28* | (2006.01) |
| *H04L 12/721* | (2013.01) |
| *H04L 12/741* | (2013.01) |

(52) U.S. Cl.
CPC .............. *H04L 45/72* (2013.01); *H04L 45/745* (2013.01)

(58) Field of Classification Search
CPC ...... H04L 45/745; H04L 45/748; H04L 45/72
USPC .......................................... 370/351, 389, 392
See application file for complete search history.

(56) References Cited

U.S. PATENT DOCUMENTS

| | | | | |
|---|---|---|---|---|
| 2006/0002368 | A1* | 1/2006 | Budampati et al. | 370/351 |
| 2008/0253306 | A1* | 10/2008 | Manion et al. | 370/255 |
| 2012/0307640 | A1* | 12/2012 | Wackerly et al. | 370/241 |
| 2014/0064091 | A1* | 3/2014 | Basso et al. | 370/235.1 |
| 2014/0064281 | A1* | 3/2014 | Basso et al. | 370/392 |
| 2014/0177640 | A1* | 6/2014 | Yang et al. | 370/401 |
| 2014/0369345 | A1* | 12/2014 | Yang et al. | 370/355 |
| 2015/0043581 | A1* | 2/2015 | Devireddy et al. | 370/392 |

* cited by examiner

*Primary Examiner* — Chi H Pham
*Assistant Examiner* — Robert Lopata
(74) *Attorney, Agent, or Firm* — Osha • Liang LLP

(57) ABSTRACT

A system for routing packets that includes leaf network devices, spine network devices, and a border gateway protocol controller to perform a method for routing packets in a network. The method includes receiving packets at a leaf device and, using the destination IP address of the packet to determine to which spine network device the packet is to be sent. The spine network devices each include a non-overlapping portion of a routing table. The spine network devices include functionality to determine a route for the packet based on its destination IP address, to determine to which leaf network device the packet is to be sent, and to send the packet to the discovered leaf network device. The leaf network device that receives the packet includes functionality to, based on the destination MAC address of the packet, determine out of which leaf network device interface to send the packet.

20 Claims, 9 Drawing Sheets

METHOD AND SYSTEM FOR ROUTING PACKETS

CROSS-REFERENCE TO RELATED APPLICATIONS

This application is a continuation application of U.S. patent application Ser. No. 14/080,193, filed on Nov. 14, 2013, and entitled: "Method and System for Routing Packets." Accordingly, this application claims benefit of U.S. patent application Ser. No. 14/080,193 under 35 U.S.C. §120. U.S. patent application Ser. No. 14/080,193 is here by incorporated by reference in its entirety.

BACKGROUND

When a packet is sent beyond the borders of a local area network from one computing device to another, it travels over a wide area network (e.g., the Internet). The journey from the sending device to the receiving device requires switches and/or routers that store information regarding routes (i.e., the path or portions of the path) that the packet must be sent on to reach its destination (i.e., the receiving device). Information regarding the routes is stored in a routing table.

SUMMARY

In general, in one aspect, the invention relates to a method for routing packets that includes receiving, at an interface of a first network device, a packet that includes a destination Internet Protocol (IP) address and determining, using the destination IP address, a first IP address of a second network device to which the packet is to be sent. The second network device is one of a plurality of network devices in a spine tier, and each of the plurality of network devices in the spine tier includes a non-overlapping portion of a routing table. The non-overlapping portion of the routing table on the second network device includes a route for the packet. The method for routing packets also includes determining, by the first network device, a first media access control (MAC) address of the second network device using the first IP address and rewriting the packet to obtain a first rewritten packet. The first rewritten packet includes the first MAC address as a destination MAC address and the destination IP address. The method also includes sending the first rewritten packet to the second network device. Additionally, the method for routing packets includes performing, by the second network device using the destination IP address, a routing table lookup. The routing table lookup includes using the non-overlapping portion of the routing table on the second network device to determine a second IP address corresponding to a third network device to which the packet is to be sent. The method for routing packets also includes determining, by the second network device, a second MAC address of the third network device using the second IP address and rewriting the first rewritten packet to obtain a second rewritten packet. The second rewritten packet includes the second MAC address as a destination MAC address and the destination IP address. The method for routing packets also includes sending the second rewritten packet to the third network device. Furthermore, the method for routing packets includes rewriting the second rewritten packet, by the third network device using the second MAC address and an egress table, to obtain a third rewritten packet. The third rewritten packet includes a third MAC address as the destination MAC address of the third rewritten packet and the destination IP address. The method for routing packets also includes sending the third rewritten packet from an interface on the third network device to an external network device. The interface on the third network device is associated with the third MAC address, and the first network device and the third network device are not in the spine tier.

In general, in one aspect, the invention relates to a system that includes one or more leaf network devices, including a first network device and a third network device, and one or more spine network devices, including the second device. Each of the plurality of spine network devices includes a non-overlapping portion of a routing table. Each of the leaf network devices is connected to each of the spine network devices. None of the plurality of leaf network devices are connected to each other. None of the spine network devices are connected to each other. The first network device is includes functionality to receive, at an interface of the first network device, a packet, which includes a destination Internet Protocol (IP) address. The first network device also includes functionality to determine, using the destination IP address, a first IP address of the second network device to which the packet is to be sent, and to determine a first media access control (MAC) address of the second network device using the first IP address. The first network device also includes functionality to rewrite the packet to obtain a first rewritten packet. The first rewritten packet includes the first MAC address as a destination MAC address and the destination IP address. The first network device also includes functionality to send the first rewritten packet to the second network device. The second network device includes functionality to perform, using the destination IP address, a routing table lookup. The routing table lookup includes using the non-overlapping portion of the routing table on the second network device to determine a second IP address corresponding to the third network device to which the packet is to be sent. The second network device also includes functionality to determine a second MAC address of the third network device using the second IP address and to rewrite the first rewritten packet to obtain a second rewritten packet. The second rewritten packet includes the second MAC address as a destination MAC address and the destination IP address. The second network device also includes functionality to send the second rewritten packet to the third network device. The third network device includes functionality to rewrite the second rewritten packet, using the second MAC address and an egress table, to obtain a third rewritten packet. The third rewritten packet includes a third MAC address as the destination MAC address of the third rewritten packet and the destination IP address. The third network device also includes functionality to send the third rewritten packet from an interface on the third network device to an external network device. The interface on the third network device is associated with the third MAC address.

In general, in one aspect, the invention relates to a non-transitory computer readable medium comprising instructions, which when executed by a processor, perform a method for routing packets. The method includes receiving, at an interface of a first network device, a packet. The packet comprises a destination Internet Protocol (IP) address. The method also includes determining, using the destination IP address, a first IP address of a second network device to which the packet is to be sent. The second network device is in a spine tier. The spine tier includes one or more network devices, each of which includes a non-overlapping portion of a routing table. The non-overlapping portion of the routing table on the second network device includes a route for the packet. The method also includes determining, by the first network device, a first media access control (MAC) address of the second network device using the first IP address, and rewriting the packet to obtain a first rewritten packet. The first rewritten packet includes the destination IP address and the first MAC address as a destination MAC address. The method also includes sending the first rewritten packet to the second network device, and performing, by the second network device using the destination IP address, a routing table lookup. The routing table lookup includes using the non-overlapping portion of the routing table on the second network device to determine a second IP address corresponding to a third network device to which the packet is to be sent. The method also includes determining, by the second network device, a second MAC address of the third network device using the second IP address, and rewriting the first rewritten packet to obtain a second rewritten packet. The second rewritten packet includes the destination IP address and the second MAC address as a destination MAC address. The method also includes sending the second rewritten packet to the third network device and rewriting the second rewritten packet, by the third network device using the second MAC address and an egress table, to obtain a third rewritten packet, wherein the third rewritten packet includes the destination IP address and a third MAC address as the destination MAC address of the third rewritten packet. The executed instructions to perform the method also includes sending the third rewritten packet from an interface on the third network device to an external network device. The interface of the third network device is associated with the third MAC address, and the first network device and the third network device are not in the spine tier.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6D, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to the use of network devices for implementing a composite router and/or an integrated composite router. More specifically, one or more embodiments of the invention include functionality to receive packets from external routers that are being sent to a location on a network and to send the packets to the appropriate next hop in the journey towards the packet's destination. In one or more embodiments of the invention, the routing table required to route packets in the network is larger than can be stored on a single network device. In one or more embodiments of the invention, the composite router and integrated composite router use merchant silicon components.

The following description describes some embodiments of the invention in which the network devices are leaf switches and spine switches. However, the invention is not limited to switches; rather embodiments of the invention may be extended to include other network devices (e.g., routers, multi-layer switches, etc.). Furthermore, the external network devices are described as external routers, however the invention is not limited to external routers; rather embodiments of the invention may be extended to include other network devices (e.g., switches, multi-layer switches, etc.) as external network devices.

Figure 1:
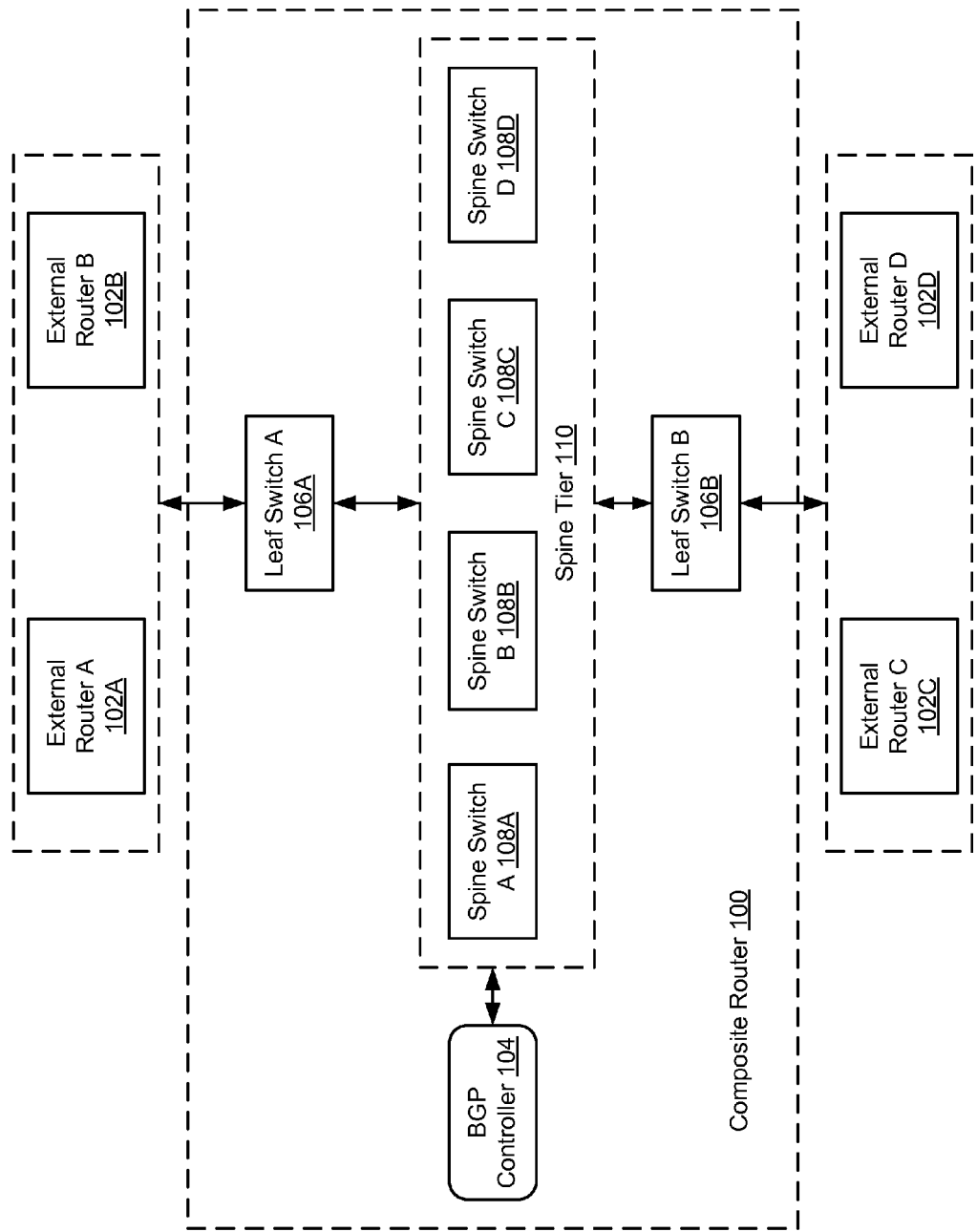
FIG. 1 shows a system that includes a composite router in accordance with one or more embodiments of the invention.

FIG. 1 shows a system in accordance with one or more embodiments of the invention. In one embodiment of the invention, the system includes external routers (102A-102D) and a composite router (100). The composite router (100) may include a border gateway protocol (BGP) controller (104), leaf switches (106A-106B), and spine switches (108A-108D) in a spine tier (110). Each of these components is described below.

In one embodiment of the invention, the composite router (100) is a set of switches that are configured to act in concert to perform the functions of a router. A router is a device that includes computer software and hardware configured to send packets between computer networks. A packet is a unit of data capable of being routed through a computer network using identifying information encapsulated in the packet. In one embodiment of the invention, packets are binary data encapsulated within information that identifies, at least, where the packet came from and where it is to be sent. In one embodiment of the invention, the packets are encapsulated within information including Internet protocol (IP) addresses. An IP address is a numerical label that uniquely identifies a network device. Examples of IP address formats include version-4 (IPv4) and version-6 (IPv6). In one embodiment of the invention, the IP addresses encapsulating data in a packet include the IP address of the network device from which the packet originated, as well as the IP address of the destination network device of the packet. A router uses the destination IP address of a packet it receives to determine where to send the packet (i.e., the "next-hop").

In one embodiment of the invention, the composite router (100) includes a routing table. A routing table may include information about the topology of the network surrounding it, the routes to network destinations, next-hop information, and metrics related to the routes. Next-hop information may include the IP address of the next network device to which the packet is to be forwarded (i.e., sent) on the route to the destination of the packet. Metrics include, but are not limited to, information related to the route the packet may take towards its destination and may be represented by numerical values representative of the "cost" of the route. For example, the cost of the route may be measured by the number of "hops" (i.e., network devices) that the packet must travel through before reaching its destination.

In one embodiment of the invention, the composite router is connected to the external routers. The composite router (100) may include routes for a network in its routing table. The routing table of the composite router may be distributed between the spine switches (108A-108D). In one embodiment of the invention, the routing table of the composite router includes more routes than can be stored on and used by a single spine switch (e.g., 108A). The routing table of the composite router (100) may include routes to enable packets to be communicated between any two devices connected to the Internet. In such cases, the routing table of the composite router may be full Internet routing table and the composite router may operate as a full Internet router.

In one embodiment of the invention, the external routers (102A-102D) are routers that each include their own routing table and that are operatively connected to the BGP controller (104) of the composite router (100). In one embodiment of the invention, the external routers (102A-102D) include functionality to share their routing tables (or portions thereof) with the BGP controller (104).

In one embodiment of the invention, the external routers (102A-102D) are each connected to at least one interface on a leaf switch (106A-106B) in the composite router (100). A switch is a physical device that includes persistent storage, memory (e.g., Random Access Memory), one or more processors, and two or more physical ports (i.e., interfaces). Each port may or may not be connected to another device on a network (e.g., a server, a switch, a router, etc.). Each switch (e.g., leaf switches 106A-106B, spine switches 108A-108D) is configured to receive packets via the ports and determine whether to (i) drop the packet, (ii) process the packet in accordance with one or more embodiments of the invention, and/or (iii) send the packet, based on the processing, out another port on the switch. How the switch makes the determination of whether to drop the packet or send the packet to another device on the network depends, in part, on whether the switch is a layer-2 (L2) switch or a layer-3 (L3) switch (also referred to as a multi-layer switch). If the switch is operating as a L2 switch, the switch uses the destination Media Access Control (MAC) address along with a forwarding table to determine out of which port to send the packet, and includes the ability to write the MAC address of the next device to receive the packet in place of its own MAC address (which the last device to send the packet wrote) in the L2 information encapsulating the packet. If the switch is operating as a L3 switch, the switch uses the destination IP address along with a routing table to determine out of which port to send the packet. If the switch is a multi-layer switch, the multi-layer switch includes functionality to process packets using both MAC addresses and IP addresses.

In one embodiment of the invention, the leaf switches (106A-106B) and the spine switches (108A-108D) are merchant silicon switches. A merchant silicon switch is a switch that is constructed from merchant silicon components. A merchant silicon component is an integrated circuit (e.g., application specific integrated circuits (ASICs)) that is designed and built by an entity other than the one that constructs a product for an end-user. For example, merchant silicon components that are designed and built by one entity to perform switch functions may be acquired by another entity that uses them to construct a switch. In one embodiment of the invention, a set of merchant silicon switches are deployed to implement the composite router (100)

In one embodiment of the invention, the leaf switches (106A-106B) are operatively connected to each of the spine switches (108A-108N) in the spine tier (110). In one embodiment of the invention, the leaf switches (106A-106B) include a supernet table. In one embodiment of the invention, the leaf switches (106A-106B) include functionality to send packets received from the external routers (102A-102D) to the spine switches (108A-108N) using the supernet table. In one embodiment of the invention, a supernet is a collection of two or more IP networks and a supernet table may include entries for ranges of IP addresses (i.e., supernets) which are associated with one of the spine switches (108A-108N) and an assigned IP address of the spine switch. The assigned IP addresses of the spine switches may be internal to the composite router (100). In one embodiment of the invention, a supernet table includes information that informs the leaf switch (106A-106B) which spine switch (108A-108D) should receive the packet. The aforementioned determination is based on the destination IP address of the packet, which falls into one of the IP address ranges associated with an entry in the supernet table.

In one embodiment of the invention, the leaf switches (106A-106B) include functionality to determine a MAC address of a spine switch based on the assigned IP address of the spine switch. The leaf switches (106A-106B) may include an address resolution protocol (ARP) table. An ARP table includes IP addresses associated with MAC addresses. The entries in an ARP table may be static or dynamic. Static ARP entries may be manually entered and stored until a change is made. A dynamic ARP entry is obtained by broadcasting an ARP request to devices on the network to determine a MAC address that corresponds to a given IP address and receiving a response in reply indicating the MAC address, which is then stored for a period of time in the ARP table. In one embodiment of the invention, the ARP tables of the leaf switches (106A-106D) include static ARP entries for each of the spine switches (108A-108D). The leaf switches (106A-106B) may include functionality to look up the assigned IP addresses of the spine switches in the ARP table to determine the MAC address corresponding to the spine switch and may also include functionality to determine which interface of the leaf switch to send the packet from based on the MAC address corresponding to the spine switch. The use of the supernet table and ARP table in steering packets from the leaf switches (106A-106B) to the spine switches (108A-108D) is described in more detail in the discussion of FIGS. 2 and 3 below.

In one embodiment of the invention, the leaf switches (106A-106B) include functionality to receive packets from the spine switches (108A-108D). The leaf switches (106A-106B) may include an egress table that includes entries for the destination MAC addresses that are written by the spine switches as the destination MAC address of the packets that are received from the spine switches (108A-108D). The destination MAC address present when a packet is received from a spine switch and may be associated, in the egress table, with: (i) the leaf switch (106A-106B) interface that is connected to the external router (102A-102D) that the packet is to be sent to as the next-hop towards its destination IP address, and (ii) the MAC address of the external router that is to be written as the new next-hop destination MAC address. The leaf switches (106A-106B) may include functionality to send packets out of interfaces connected to the external router (102A-102D) based on the destination MAC address information in the packet received from the spine switches (108A-108D). The use of the egress table in steering packets from the leaf switches (106A-106B) to the external routers (102A-102D) is described in more detail in the discussion of FIGS. 2 and 3 below.

In one embodiment of the invention, the persistent storage (not shown) in the leaf and spine switches (106A-106B, 108A-108D) may also include any non-transitory computer readable medium that includes instructions, which, when executed by one or more processors in the switches, enable the switch to perform the functions described in accordance with one or more embodiments of the invention.

In one embodiment of the invention, the external routers (102A-102D) are operatively connected to the BGP controller (104) of the composite router (100). BGP is a routing protocol that provides for communication between autonomous systems (AS). Routing protocols are used by routers to communicate with one another, to determine which routes to enter into a routing table, and to determine which routes to use to send packets. Autonomous systems are connected groups of IP networks that adhere to a common routing policy and are identified by a unique AS number (ASN).

In one embodiment of the invention, the external routers (102A-102D) are BGP peers of the BGP controller (104) of the composite router (100). BGP peers are routers running BGP that are configured to share routing table information with one another. In one embodiment of the invention, the external routers (102A-102D) are configured to send routing table information advertising the routes available via the external routers (102A-102D) to the BGP controller (104). The BGP controller (104) is configured to send routing table information for the composite router (100) to the external routers (102A-102D) and configured to receive routing table information from the external routers (102A-102D).

In one embodiment of the invention, the BGP controller (104) is operatively connected to the external routers (102A-102D) as well as to the spine switches (108A-108D). In one embodiment of the invention, the BGP controller (104) is a computing device that includes computing software and hardware configured to implement BGP functionality.

In one embodiment of the invention, the BGP controller (104) includes functionality to, using the routing table information provided by the external routers (102A-102D), generate a routing table for a network. In one embodiment of the invention, the routing table generated by the BGP controller is a routing table for an entire network. In one embodiment of the invention, the routing table generated by the BGP controller (104) is a full Internet routing table. In one embodiment of the invention, a full Internet routing table is a routing table that includes route entries for accessing any AS connected to the Internet. In another embodiment of the invention, the BGP controller includes functionality to generate a partial Internet routing table that is a subset of the full Internet routing table. The routing table generated by the BGP controller (104) may only includes only best paths. Best paths are the routes advertised to the BGP controller (104) by the external routers (102A-102D) that represent the best path for a packet to take to get to a given destination IP address. The BGP controller (104) may include functionality to calculate the best path to enter as a route entry based on the routing table information, including metrics that are received from the external routers (102A-102D).

In one embodiment of the invention, the BGP controller (104) includes a next-hop mapping table. In one embodiment of the invention, the next-hop mapping table includes information that associates the interfaces of the leaf switches (102A-102B) (which have assigned IP addresses) and the IP addresses of the external routers (102A-102D) to which the leaf switches (106A-106B) are connected. In one embodiment of the invention, each leaf switch interface that is connected to an external router is assigned a unique IP address. The assigned IP address may identify which leaf switch (106A-106B) the spine switch (108A-108D) should send the packet to as well as the interface on the leaf switch out of which the packet should be sent. The BGP controller (104) may includes functionality to, after generating the routing table, replace the next-hop IP address information that is included in the routing table information provided by the external routers (102A-102D) with the assigned IP address corresponding to the leaf switch (106A-106B) interface that is connected to the appropriate external router (102A-102D).

In one embodiment of the invention, the BGP controller (104) includes functionality to distribute non-overlapping portions of the routing table to the spine switches (108A-108D). In one embodiment of the invention, the routing table is evenly distributed among the spine switches (108A-108D). In one embodiment of the invention, the routing table is unevenly distributed among the spine switches (108A-108D) based on the policies and requirements of the network in which the composite router (100) is deployed. The distribution of the routing table among the spine switches is determined may be based on load balancing policies implemented by the BGP controller (104) to control the network traffic load seen by each spine switch (108A-108D). The distribution of the routing table among the spine switches may be dynamically rebalanced to maintain an even distribution or to adhere with network requirements. The re-balancing may be performed at periodic intervals. In one embodiment of the invention, the BGP controller (104) includes functionality to dynamically update the route entries of the portions of the routing table that are distributed to the spine switches (108A-108D) as new routes are received from the external routers (102A-102D).

In one embodiment of the invention, each spine switch (108A-108D) is operatively connected to the BGP controller and operatively connected to each leaf switch (104A-104B). Each spine switch (108A-108D) may include a non-overlapping portion of the routing table received from the BGP controller as well functionality to associate the assigned IP addresses of the leaf switch interfaces with assigned MAC addresses of the leaf switch interfaces. Each spine switch may also include an ARP table for associating the assigned IP addresses (with which the BGP controller replaced next-hop IP addresses in the routing table entries) with assigned MAC addresses. In one embodiment of the invention, the ARP table entries associating the assigned IP addresses with the assigned MAC addresses are static ARP table entries. In one embodiment of the invention, the spine switch includes functionality to lookup the destination IP address in the non-overlapping portion of the routing table that is stored on the spine switch (108A-108D). For example, the spine switch may use a longest prefix match (LPM) algorithm to determine which routing table entry to select from the routing table that is the appropriate route by which the packet can reach its destination IP address. The LPM algorithm identifies the most specific routing table entry corresponding to the destination IP address of a packet.

In one embodiment of the invention, the IP address discovered by the lookup in the non-overlapping portion of the routing table of the composite router (100) stored on the spine switch (108A-108D) (i.e., the assigned IP address that the BGP controller replaced the next-hop IP address with) is used to find a static entry in an ARP table stored on the spine switch that includes a next-hop MAC address that corresponds to an interface on a leaf switch that is connected to the appropriate external router (102A-102D) to which the packet is to be sent.

In one embodiment of the invention, the spine switches (108A-108D) include functionality to send and receive packets to and from the leaf switches (104A-104D).

Although FIG. 1 shows four external peers, two leaf switches, and four spine switches, in one or more embodiments of the invention, the quantity of each of these system components may vary based on the particular needs of a given implementation of the composite router. For example, there may be more external routers connected to the leaf switches provided that the leaf switches have additional interfaces available. Additionally, the number of leaf switches may increase or decrease relative to the number of external routers that require connectivity or the network traffic load conditions experienced by the leaf switches. Also, the quantity of spine switches may increase or decrease relative to the number of leaf switches that require connectivity, the network traffic load conditions experienced by the spine switches, or the size of the routing table that is distributed among the spine switches.

The invention is not limited to the system configuration shown in FIG. 1.

Figure 2:
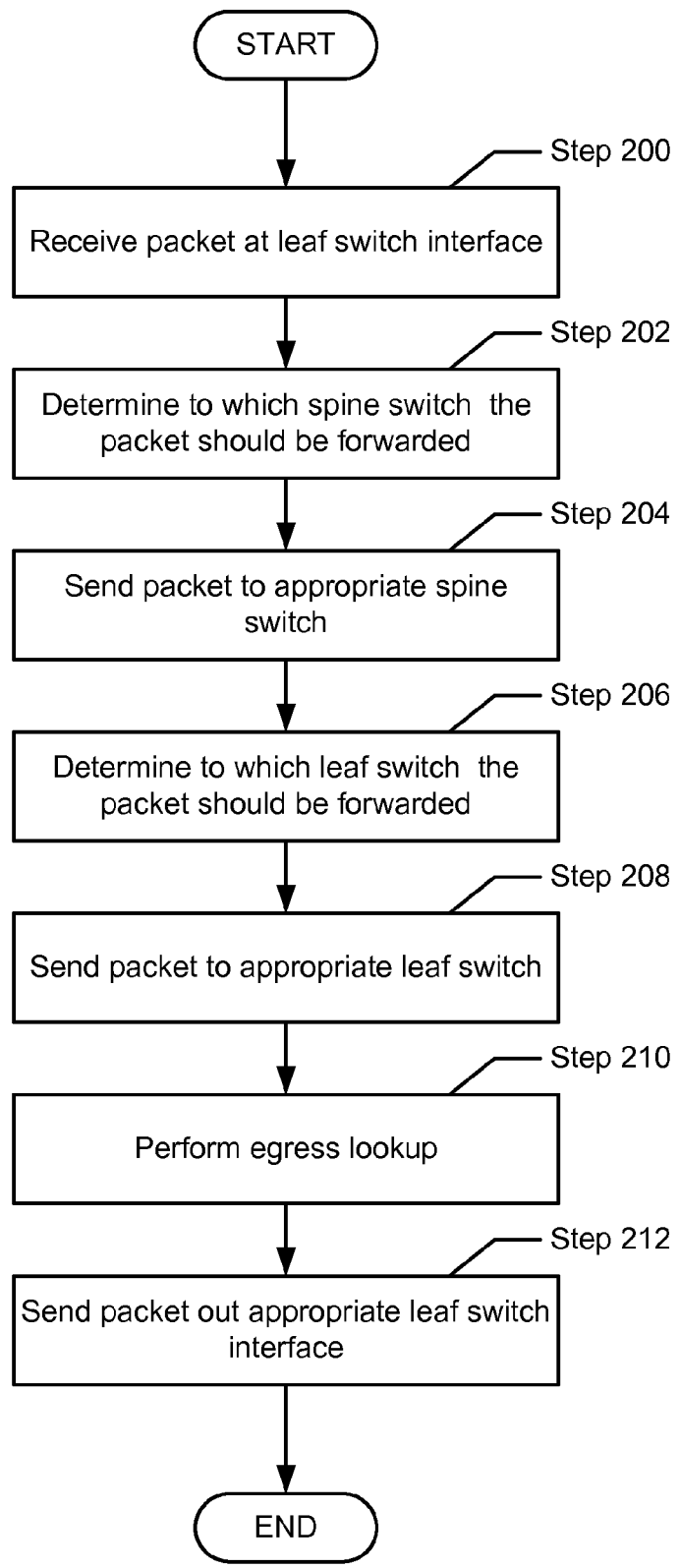
FIG. 2 shows a flowchart in accordance with one or more embodiments of the invention.

FIG. 2 shows a flowchart in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 2 may be performed in parallel with any other steps shown in FIG. 2 without departing from the invention.

Turning to FIG. 2, FIG. 2 shows a flowchart that describes a method for receiving packets at and sending packets from a composite router in accordance with one or more embodiments of the system. In Step 200, a packet is received at a leaf switch interface. In one embodiment of the invention, the packet originates at a remote device and is sent towards a destination IP address and arrives at a leaf switch via an external router.

In Step 202, the leaf switch determines to which spine switch interface the packet should be forwarded. In one embodiment of the invention, the leaf switch first performs a supernet table lookup. As discussed above, the supernet table includes an entry for each spine switch to which the leaf switch is connected. The leaf switch determines what IP address range the destination IP address of the packet falls within and selects the entry in the supernet table corresponding to that range. As discussed above, the entries in the supernet table also include an IP address that corresponds to the spine switch interface to which the leaf switch is connected. Accordingly, the leaf switch uses the spine switch interface IP address in the supernet table entry to lookup the MAC address of the spine switch interface in an ARP table. The leaf switch then re-writes the packet with the next-hop MAC address of the spine switch interface as the destination MAC address of the packet.

In Step 204, the leaf switch sends the packet generated in Step 202 to the spine switch interface identified by the next hop MAC address that was written into the packet in Step 202. In Step 206, the spine switch determines to which leaf switch the packet should be forwarded. More specifically, in one embodiment of the invention, once the packet is received by the spine switch, the spine switch performs an LPM lookup of the destination IP address of the packet in the non-overlapping portion of the routing table stored on the spine switch in order to identify a routing table entry. The routing table entry corresponding to the destination IP address of the packet includes the next-hop IP address information that identifies the correct leaf switch interface to which the packet is to be sent from such that it can continue towards its destination via one of the external routers connected to a leaf switch interface. In one embodiment of the invention, the spine switch uses the next-hop IP address to lookup a destination MAC address in the ARP table stored on the spine switch. In one embodiment of the invention, the ARP table includes a static entry for the next-hop IP address written by the BGP controller and the MAC address in the static entry is a MAC address that corresponds to a specific leaf switch and a specific leaf switch interface. The spine switch rewrites the packet to include the MAC address corresponding to the next-hop IP address as the destination MAC address of the packet.

In Step 208, the spine switch sends the packet rewritten in Step 206 to the leaf switch identified by the destination MAC address written into the packet in Step 206. In Step 210, the leaf switch determines out of which interface the packet should be sent. More specifically, once the leaf switch receives the packet, the packet is examined to identify the destination MAC address. In one embodiment of the invention, when the leaf switch determines that the destination MAC address was written by a spine switch in a packet that is to be sent to one of the external routers connected to the leaf switch, the leaf switch performs a lookup in the egress table using the destination MAC address. In one embodiment of the invention, each entry in the egress table associates a MAC address written by the spine switch as the destination MAC address with the MAC address of an external peer connected to a leaf switch interface, as well as the leaf switch interface from which the packet is to be sent. Using the above information, the leaf switch writes the MAC address of the external peer as the destination MAC address of the packet.

In Step 212, the leaf switch sends the packet out of the leaf interface connected to the external router corresponding to the destination MAC address written to the packet in Step 210.

Figure 3:
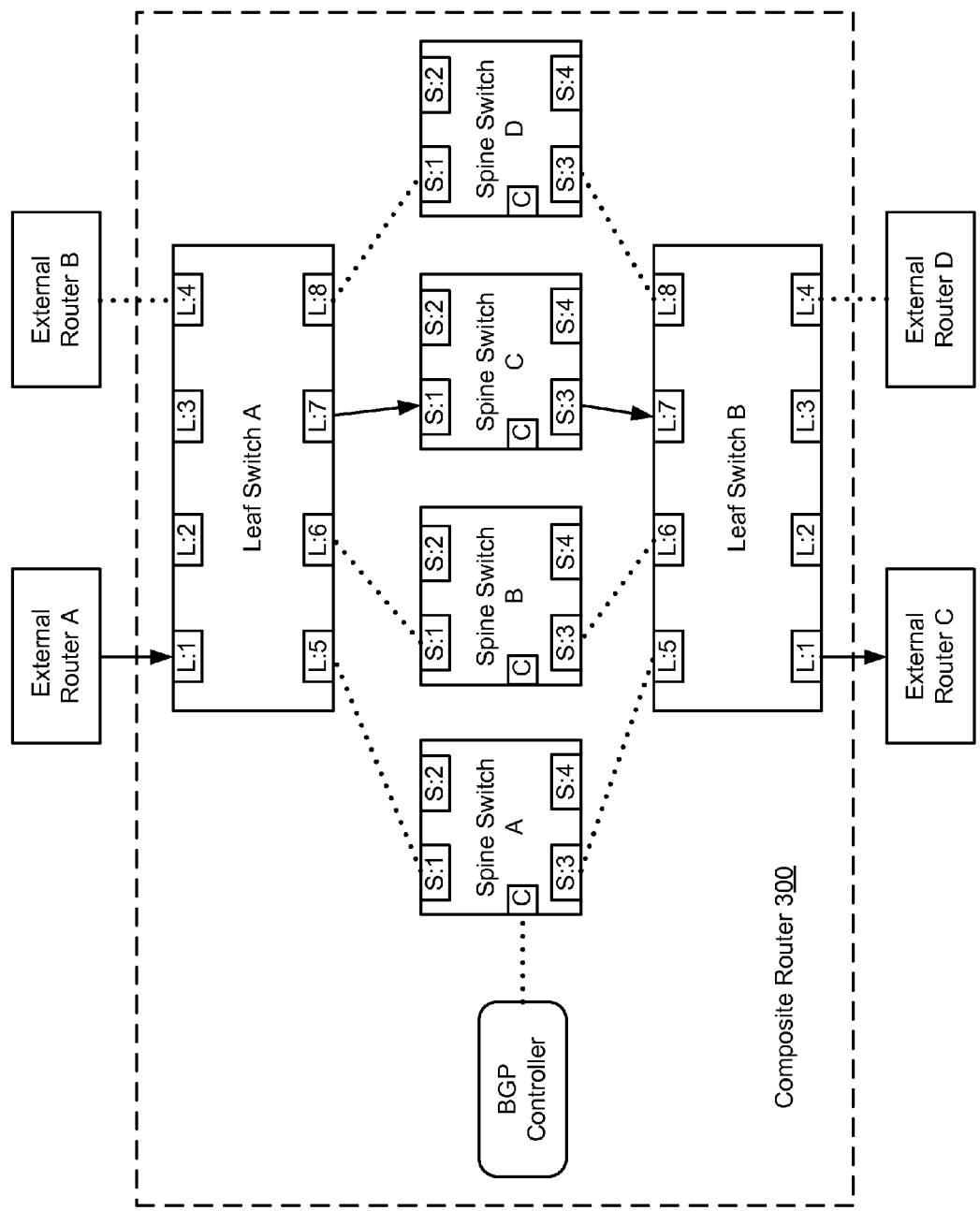
FIG. 3 shows an example in accordance with one or more embodiments of the invention.

FIG. 3 shows an example in accordance with one or more embodiments of the invention. The example is not intended to limit the scope of the invention.

Referring to FIG. 3, consider the scenario in which a composite router is deployed using a BGP controller, four spine switches, and two leaf switches, and each leaf switch is connected to two external routers. The composite router's BGP controller in this scenario has received routing table information from all external routers, constructed a routing table, modified the next hop IP address in each entry to be an IP address corresponding to one of the leaf switch interfaces, and distributed the routing table evenly among the four spine switches. Even distribution results in each spine switch storing one-fourth of the routing table.

In this example, external router C has previously shared the following route with the BGP controller of the composite router:

TABLE 1

| Routing Table Entry | | | |
|---|---|---|---|
| Network destination | Netmask | Next-hop IP address | Metric |
| 172.0.0.0 | 255.0.0.0 | 172.27.1.1 | 10 |

When external router C shared this routing table entry with the BGP controller, the BGP controller replaced the next-hop IP address of the routing table entry before distributing this route to spine switch C, which the BGP controller knows includes the appropriate IP address range for this route in its non-overlapping portion of the composite router routing table. The BGP controller replaced this IP address, using the next-hop mapping table, with an IP address corresponding to the leaf switch B interface L:1 that is connected to external router C. In this example, the next-hop IP address corresponding to leaf switch B interface L:1 is 169.254.7.1. Thus, the routing table entry modified by the BGP controller and distributed to spine switch C is now as follows:

TABLE 2

Modified Routing Table Entry

| Network destination | Netmask | Next-hop IP address | Metric |
|---|---|---|---|
| 172.0.0.0 | 255.0.0.0 | 169.254.7.1 | 10 |

In accordance with this example, after routing table entry shown in Table 2 is sent to spine switch C, a packet arrives from external router A at interface L:1 of leaf switch A. The destination address of the packet requires the packet to be sent to a network accessible through external router C. In this case, leaf switch A examines the packet and determines the destination IP address of the packet is 172.89.27.3. Leaf switch A looks up this IP address in its supernet table. The supernet table includes the following information:

TABLE 3

Supernet Table

| IP address ranges | Spine switch to forward packet to | Next-hop IP address |
|---|---|---|
| 1.0.0.0/8-63.0.0.0/8 | Spine Switch A | 169.254.1.254 |
| 64.0.0.0/8-127.0.0.0/8 | Spine Switch B | 169.254.2.254 |
| 128.0.0.0/8-191.0.0.0/8 | Spine Switch C | 169.254.3.254 |
| 192.0.0.0/8-254.0.0.0/8 | Spine Switch D | 169.254.4.254 |

Note that in this example the supernet table includes IP address ranges for any potential IPv4 destination IP address that could arrive at the leaf switch. Leaf switch A determines that 172.89.27.3 falls into the IP address range corresponding to spine switch C. The next-hop IP address in the entry for spine switch C is 169.254.3.254. Leaf switch A then uses the next-hop IP address to look up the destination MAC address in the ARP table. The ARP table of leaf switch A in this example has an entry that associates the MAC address 00:1c:73:27:cc:03 with IP address 169.254.3.254. MAC address 00:1c:73:27:cc:03 is the MAC address that corresponds to spine switch C, which is connected to interface L:7 of leaf switch A. Leaf switch A thus rewrites the destination MAC address of the packet as 00:1c:73:27:cc:03 and sends the packet out of interface L:7 towards interface S:1 of spine switch C.

Once the packet is received at interface S:1 of spine switch C, spine switch C examines the packet and determines the destination IP address to be 172.89.27.3. Spine switch C uses this destination IP address to perform an LPM lookup in its non-overlapping portion of the routing table of the composite router to find the routing table entry that provides a route to the destination IP address (i.e., the modified routing table entry of Table 2, above). The route discovered in this example corresponds to the route table entry shown in Table 2 above.

Next, spine switch C uses the next-hop IP address in the identified route table entry to perform a lookup in the ARP table of spine switch C. The ARP table of spine switch C in this example has an entry that associates the MAC address 00:1c:73:28:bb:01 with IP address 169.254.7.1. The MAC address in the ARP table entry is unique and informs the recipient leaf switch that that the packet comes from a spine switch as well as from what leaf switch interface the packet should be forwarded. In this example, MAC address 00:1c:73:28:bb:01 is the MAC address that corresponds to interface L:1 of leaf switch B which is connected to external router C. Spine switch C thus re-writes the destination MAC address of the packet as 00:1 c:73:28:bb:01 and sends the packet out of interface S:3 towards interface L:7 of leaf switch B.

Once the packet is received at interface L:7 of leaf switch B, leaf switch B examines the packet and determines that the packet has been sent from spine switch C by examining the destination MAC address. In one embodiment of the invention, the packet is deemed to have been sent from a spine switch if the packet includes a destination MAC address in its egress table. All packets received from spine switches that are to be sent to external routers are given such a MAC address by the sending spine switch so the receiving leaf switch can perform a lookup in the egress table rather than any other table stored on the leaf switch. In this example, the egress table includes the following entry:

TABLE 4

Egress table

| Received Destination MAC Address | Leaf Switch Egress Interface | Egress MAC Rewrite | Target External Router |
|---|---|---|---|
| 00:1c:73:28:bb:01 | L:1 | 1a:b2:27:89:c2 | External Router C |

In this example, leaf switch B uses the destination MAC address of the packet received from the spine switch to perform a lookup in the egress table to find the associated MAC address of external router C, which is 1a:b2:27:89:c2, and the leaf switch interface from which the packet is to be sent (i.e., L:1). Leaf switch B then rewrites the destination MAC address of the packet as 1a:b2:27:89:c2 and the packet is sent to external router C via leaf switch interface L:1 to continue its journey towards the destination IP address.

One of ordinary skill in the art will appreciate that although ARP tables are described above description of FIGS. 1-3, any table that associates IP addresses with MAC addresses may be used provided the table includes an entry for each IP address from the supernet table that corresponds to a spine switch and that includes the appropriate MAC address to inform the composite router out of which leaf switch interface to send the packet.

Figure 4:
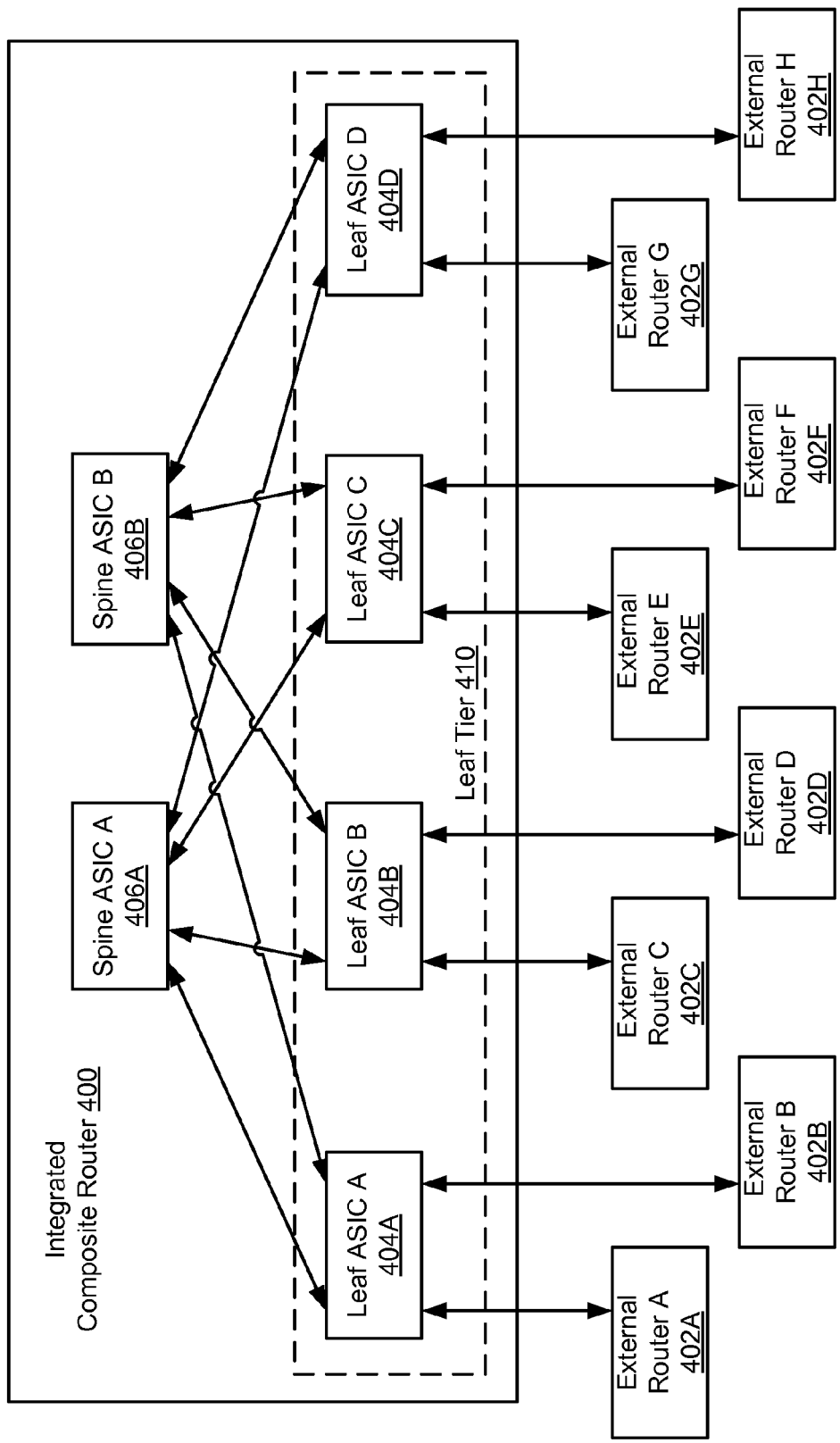
FIG. 4 shows a system that includes an integrated composite router in accordance with one or more embodiments of the invention.

FIG. 4 shows a system that includes an integrated composite router in accordance with one or more embodiments of the invention. In one embodiment of the invention, the system includes external routers (402A-402H) and an integrated composite router (400). Integrated composite router (400) may include leaf application specific integrated circuits (ASICs) (404A-404D) in a leaf tier (410) as well as spine ASICs (406A-406B). Each of these components is described below.

In one embodiment of the invention, the integrated composite router (400) is a set of switch ASICs that are configured to act in concert to perform the functions of a router. The switch ASICs may be implemented as a single device (e.g., a single chassis). In one embodiment of the invention, the integrated composite router (400) is connected to the external routers.

In one embodiment of the invention, the integrated composite router (400) includes a routing table and includes routes for a network in the routing table. The routing table of the integrated composite router may be distributed between the leaf ASICs (404A-404D) where the routing table of the integrated composite router (400) includes more routes than can be stored on and used by a single leaf ASIC (e.g., 404A). The routing table of the integrated composite router (100) may include routes for moving packets around the Internet and in such cases, the routing table of the integrated composite router may be a full Internet routing table and the composite router (400) may be a full Internet router.

In one embodiment of the invention, the external routers (402A-402H) are substantially similar to the external routers (102A-102D) in FIG. 1. In one embodiment of the invention, the external routers (402A-402H) are each connected to at least one interface (also referred to as ports) of the integrated composite router (400), which is in turn connected to a leaf ASIC (404A-404D). The external routers (402A-402H) include functionality to share their routing table information with the integrated composite router (400) and include functionality to send packets to and receive packets from the leaf ASICs (404A-404D).

In one embodiment of the invention, the external routers (402A-402H) are BGP peers of the integrated composite router (400). In such cases, the external routers (402A-402H) are configured to send routing table information advertising the routes available via the external routers (402A-402H) to the integrated composite router (400). The integrated composite router may also includes functionality to send routing table information for the integrated composite router (400) to the external routers (402A-402H).

In one embodiment of the invention, the integrated composite router (400) includes functionality to, using the routing table information provided by the external routers (402A-402H), generate a routing table for a network. The routing table generated by the composite router (400) may be a routing table for an entire network. The routing table generated by the integrated composite router (400) may be is a full Internet routing table. In another embodiment of the invention, the integrated composite router (400) includes functionality to generate a partial Internet routing table that is a subset of the full Internet routing table. The routing table generated by the integrated composite router (400) may only include best paths. Best paths are the routes advertised to the integrated composite router (400) by the external routers (402A-402H) that represent the best path for a packet to take to get to a given destination IP address. The integrated composite router (400) may include functionality to calculate the best path to enter as a route entry based on the routing table information, including metrics that are received from the external routers (402A-402H).

In one embodiment of the invention, the integrated composite router (400) includes functionality to distribute non-overlapping portions of the routing table to the leaf ASICs (404A-404D). The routing table may be evenly distributed among the leaf ASICs (404A-404D) or, alternatively, the routing table may be unevenly distributed among the leaf ASICs (404A-404D) based on the policies and requirements of the network in which the integrated composite router (400) is deployed. The distribution of the routing table among the spine switches may be determined based on load balancing policies implemented by the integrated composite router (400) to control the network traffic load seen by each leaf ASIC (404A-404D). The distribution of the routing table among the leaf ASICs (404A-404D) may be dynamically rebalanced to maintain an even distribution or to adhere with network requirements, where the re-balancing is performed at periodic intervals. In one embodiment of the invention, the integrated composite router (400) includes functionality to dynamically update the route entries of the portions of the routing table that are distributed to the leaf ASICs (404A-404D) as new routes are received from the external routers (402A-402H).

In one embodiment of the invention, the specific application of the ASIC of the leaf ASICs (404A-404D) is to function as a switch that is a component of the integrated composite router and includes functionality to send, receive, and make decisions regarding packets using L2 and L3 information. In one embodiment of the invention, the leaf ASICs together form the leaf tier (410) of the integrated composite router (400). In one embodiment of the invention, the leaf ASICs (404A-404D) are merchant silicon ASICs. Merchant silicon ASICs, similar to the merchant silicon switches discussed in the description of FIG. 1, above, are designed and built by an entity other than the one that constructs a product for an end-user for the purpose of implementing specific functionality (e.g, switch functionality). In one embodiment of the invention, merchant silicon ASICs that perform L2, L3, and/or multilayer switch functions (e.g., the leaf ASICS and the spine ASICs) are connected within a single chassis to implement the integrated composite router (400).

In one embodiment of the leaf ASICs (404A-404D) include functionality to store a non-overlapping portion of the routing table of the integrated composite router. The leaf ASICs (404A-404D) also include functionality to perform LPM lookups in the non-overlapping portion of the routing table that they store. The leaf ASICs (404A-404D) may also include a supernet table that is substantially similar to the supernet table of the leaf switches (106A-106B) described in FIG. 1.

In one embodiment of the invention, the leaf ASICs include a host routes table. A host routes table includes one entry for each external router (402A-402H) as well as one entry for each leaf ASIC other than the leaf ASIC on which the host routes table is stored. For example, leaf ASIC A (404A) has entries in the host routes table for external routers (402A-402H) and leaf ASICs B, C, and D (404B, 404C,404D); leaf ASIC B has entries in the host routes table for external routers (402A-402H) and leaf ASICs A, C, and D (404A, 404C, 404D), etc. The host routes table entries associate the IP addresses corresponding to the external routers and the other leaf ASICs with an assigned MAC address.

In one embodiment of the invention, each leaf ASIC (404A-404D) includes an egress table. An egress table includes entries that associates MAC addresses with interfaces of the leaf ASIC. In one embodiment of the invention, each leaf ASIC (404A-404D) includes a MAC pointer table. A MAC pointer table includes entries that associate MAC addresses with pointers to the portion of the routing table stored in the leaf ASIC (404A-404D), the host routes table, the egress table, as well as a pointer to instructions that enables the re-writing of destination MAC addresses of packets. The use of the various tables in one embodiment of the invention is described in greater detail in the discussion of FIGS. 5-6D below.

In one embodiment of the invention, the leaf ASICs (404A-404D) of the integrated composite router (400) include functionality to receive routing table information from the external routers (402A-402H) as well as functionality to update the appropriate portions of the routing tables on the various leaf ASICs with the received routing table information. In one embodiment of the invention, the leaf ASICs (404A-404D) include functionality to dynamically update the distributed portions of the routing table of the integrated composite router (400) with new route entries as the external routers (402A-402H) advertise new route information.

In one embodiment of the invention, the leaf ASICs are connected to spine ASICs (406A-406B). In one embodiment of the invention, the spine ASICs (406A-406B) are merchant silicon ASICs. In one embodiment of the invention, the specific application performed by the spine ASICs (406A-406B) is to perform L2 switch functions. L2 switch functions include using the destination MAC address of received packets along with a forwarding table to determine out of which interface to forward the packet. In one embodiment of the invention, the forwarding table on the spine ASICs (406A-406B) includes entries that associate MAC addresses with interfaces from which to forward packets.

In one embodiment of the invention, the persistent storage (not shown) in the leaf and spine ASICs (404A-404B, 406A-406D) and the integrated composite router (400) may also include any non-transitory computer readable medium that includes instructions, which, when executed by one or more processors in the integrated composite router (400) and the leaf and spine ASICs (404A-404B, 406A-406D), enable the integrated composite router (400) and the leaf and spine ASICs (404A-404B, 406A-406D) to perform the functions described in accordance with one or more embodiments of the invention.

Although FIG. 4 shows eight external routers, four leaf ASICs, and two spine ASICs, in one or more embodiments of the invention, the quantity of each of these system components may vary based on the particular needs of a given implementation of the integrated composite router. For example, there may be more external routers connected to the leaf ASICs provided that the leaf ASICs have additional interfaces available. Additionally, the number of leaf ASICs may increase or decrease relative to the number of external routers that require connectivity or the network traffic load conditions experienced by the leaf ASICs, or the size of the routing table that is distributed among the leaf ASICs. Also, the quantity of spine ASICs may increase or decrease relative to the number of leaf ASICs that require connectivity, the network traffic load conditions experienced by the spine ASICs. For example, in FIG. 4 two spine ASICs are shown to provide redundancy, however the integrated composite router may be implemented without redundancy, or it may be implemented with four to provide greater redundancy or greater scalability. Additionally, although the discussion of FIG. 4 includes leaf and spine ASICs, the functionality of the integrated composite router may be implemented with a collection of network devices, such as routers or switches, that are not integrated into a single chassis/device and are configured to work in concert with one another to route packets. For example, the merchant silicon ASICs for the leaf ASICs and spine ASICs may each be implemented as standalone switches rather than integrated into a single unit (i.e., single device or chassis).

The invention is not limited to the system configuration shown in FIG. 4.

Figure 5:
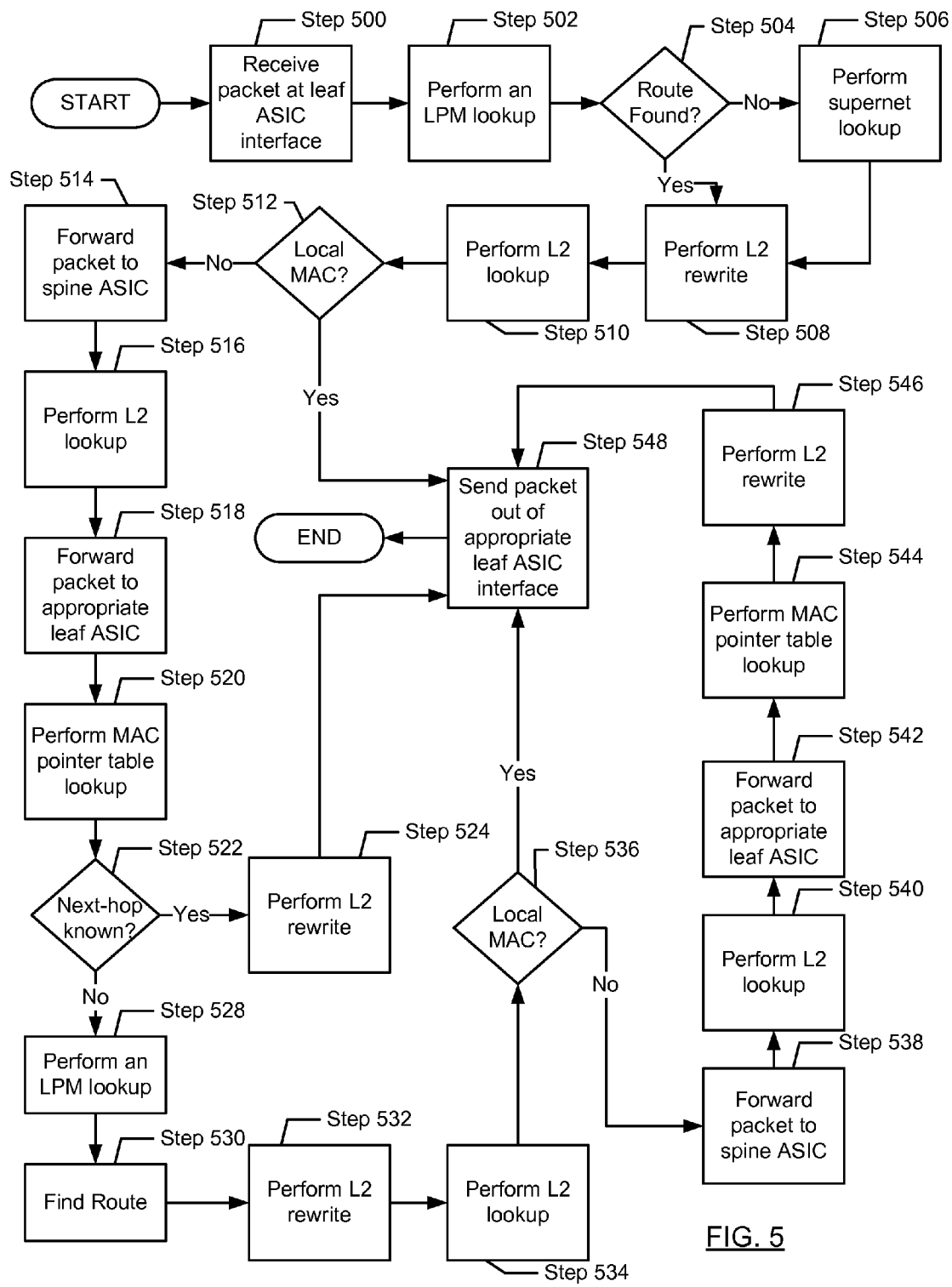
FIG. 5 shows a flowchart in accordance with one or more embodiments of the invention.

FIG. 5 shows a flowchart in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 5 may be performed in parallel with any other steps shown in FIG. 5 without departing from the invention.

Turning to FIG. 5, FIG. 5 shows a flowchart that describes a method for receiving packets at and sending packets from an integrated composite router in accordance with one or more embodiments of the invention. In one embodiment of the invention, the packet originates at a remote device, is sent towards a destination IP address, and arrives at a leaf ASIC via an external router.

In Step 500, a packet arrives at an interface of the integrated composite router that is operatively connected to a leaf ASIC. In one embodiment of the invention, the packet is from an external router includes, at least, a destination IP address.

In Step 502, the leaf ASIC performs an LPM lookup in the non-overlapping portion of the integrated composite router's routing table stored on the leaf ASIC based on the destination IP address of the received packet. In Step 504, the leaf ASIC determines if there is a routing table entry with a route corresponding to the destination IP address of the packet. In one embodiment of the invention, when the LPM lookup produces a valid result, then the leaf ASIC has a route entry for the packet. In one embodiment of the invention, the valid result is the IP address of the next-hop, which is an external router connected to one of the leaf ASICs. In this case, the process proceeds to Step 508. In one embodiment of the invention, if the LPM lookup fails to find a routing table entry, then the leaf ASIC does not know the route for the packet and the process proceeds to Step 506.

In Step 506, the leaf ASIC performs a lookup in the supernet table based on the destination IP address. In one embodiment of the invention, the result of the supernet table lookup is an IP address that corresponds to one of the other leaf ASICs that is storing the non-overlapping portion of the routing table that includes the routing table entry for the destination IP address of the packet.

In Step 508, the leaf ASIC examines the host routes table to lookup the IP address discovered in either Step 502 (i.e., an external router IP) or Step 506 (i.e., an IP corresponding to another leaf ASIC). In one embodiment of the invention, the entry in the host routes table corresponding to the discovered IP address includes a destination MAC address, which the leaf ASIC re-writes as the destination MAC address of the packet.

In Step 510, the leaf ASIC performs a lookup in the egress table. In one embodiment of the invention, the egress table includes entries for each MAC address in the host route table entries. In Step 512, a determination is made as to whether the destination MAC address written in Step 508 corresponds to a MAC address for an external router connected to the leaf ASIC that received the packet or to a leaf ASIC interface on another leaf ASIC. In one embodiment of the invention, if the destination MAC corresponds to an external router to which the leaf ASIC is connected, the process proceeds to Step 548. If the destination MAC address corresponds to an interface on one of the other leaf ASICs, then the process proceeds to step 514.

In Step 514, the packet is forwarded to a spine ASIC. In one embodiment of the invention, each spine ASIC includes a forwarding table in which the destination MAC address of received packets has an entry. In one embodiment of the invention, the entry in the forwarding table corresponding to a destination MAC address written by a leaf ASIC includes the correct interface of the spine ASIC to forward the packet from to reach the appropriate leaf ASIC. In Step 516, the destination MAC address is used to perform a lookup in the forwarding table. In Step 518, the spine ASIC forwards the packet to the appropriate leaf ASIC out of the appropriate spine ASIC interface.

In Step 520, the leaf ASIC receives the packet from the spine ASIC and uses the destination MAC address to perform a lookup in the MAC pointer table. In one embodiment of the invention, the MAC pointer table includes entries that associate the destination MAC address with either the MAC address of a connected external router or a pointer to the non-overlapping portion of the routing table that is stored on the leaf ASIC.

In Step 522, the process determines that the destination MAC address is associated in the MAC pointer table with a pointer to the non-overlapping portion of the routing table stored on the leaf ASIC or corresponds to an external router connected to a leaf ASIC. In one embodiment of the invention, when the destination MAC address is associated in the MAC pointer table with a pointer to the portion of the routing table stored on the leaf ASIC, the process proceeds to Step 528. In one embodiment of the invention, when the destination MAC address corresponds to an external router connected to the leaf ASIC, the process proceeds to step 524. In Step 524, the destination MAC address of the packet is rewritten to be that of the appropriate connected external router. The process then proceeds to Step 548.

Turning to Step 528, the destination IP address of the packet is used to perform an LPM lookup in the portion of the routing table stored on the leaf ASIC. In one embodiment of the invention, the destination MAC address written in Step 508 corresponds to the leaf ASIC that included the non-overlapping portion of the routing table that had a route entry corresponding to the destination IP address of the packet. In Step 530, the corresponding route table entry is found in the table.

In Step 532, the leaf ASIC examines the host routes table to lookup the IP address discovered in Step 528 (i.e., an external router IP). In one embodiment of the invention, the entry in the host routes table corresponding to the discovered IP address includes a MAC address, which the leaf ASIC rewrites as the destination MAC address of the packet.

In Step 534, the leaf ASIC performs a lookup in the egress table. In one embodiment of the invention, the egress table includes entries for each MAC address in the host routes table. In Step 536, a determination is made as to whether the destination MAC address written in Step 532 corresponds to a MAC address for an external router connected to the leaf ASIC that received the packet or to a leaf ASIC interface on another leaf ASIC. In one embodiment of the invention, if the destination MAC address corresponds to an external router to which the leaf ASIC is connected, the process proceeds to Step 548. If the destination MAC address corresponds to an interface on one of the other leaf ASICs, then the process proceeds to step 538.

In Step 538, the packet is forwarded to a spine ASIC. In one embodiment of the invention, each spine ASIC includes a forwarding table in which the destination MAC address of received packets has an entry. In one embodiment of the invention, the entry in the forwarding table corresponding to a destination MAC address written by a leaf ASIC includes the correct interface of the spine ASIC to forward the packet from to reach the appropriate leaf ASIC. In Step 540, the destination MAC address is used to perform a lookup in the forwarding table. In Step 542, the spine ASIC forwards the packet to the appropriate leaf ASIC out of the appropriate spine ASIC interface.

In Step 544, the leaf ASIC receives the packet from the spine ASIC and uses the destination MAC address to perform a lookup in the MAC pointer table. In one embodiment of the invention, the MAC pointer table includes entries that associate the destination MAC address with the MAC address of a connected external router. In Step 546, the destination MAC address of the packet is rewritten as the MAC address of the appropriate connected external router.

Turning to Step 548, the leaf ASIC sends the packet out of the appropriate interface connected to the external router identified by the destination MAC address.

Figure 6A:
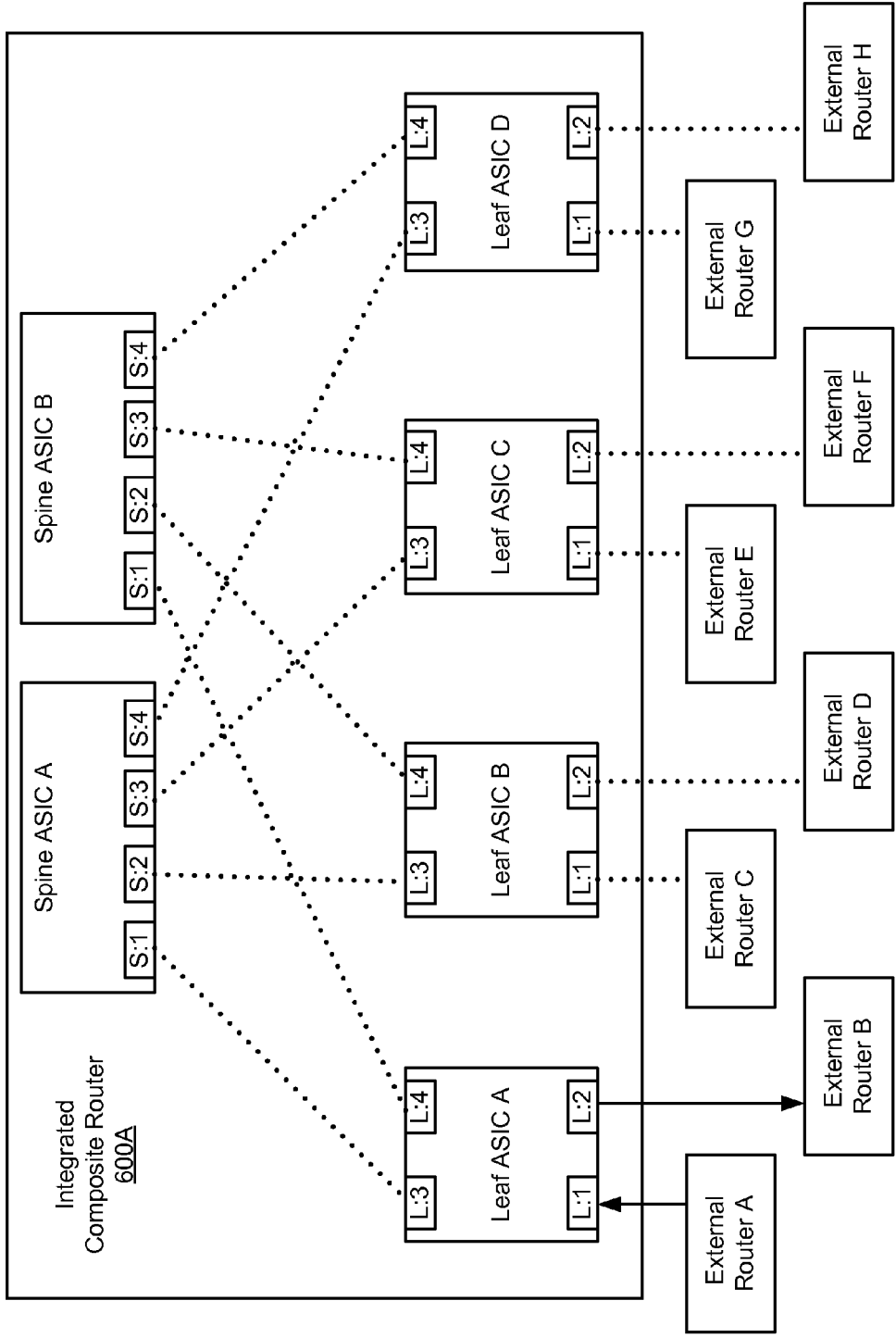
FIGS. 6A, 6B, 6C, and 6D show examples in accordance with one embodiment of the invention.

FIG. 6A shows an example in accordance with one or more embodiments of the invention. The example is not intended to limit the scope of the invention.

Referring to FIG. 6A, consider the scenario in which an integrated composite router is deployed using two spine ASICs and four leaf ASICs, and each leaf ASIC is connected to two external routers. The integrated composite router in this scenario has received routing table information from all external routers, constructed a routing table and distributed the routing table evenly among the four leaf ASICs. Even distribution results in each leaf ASIC one-fourth of the routing table.

In this example, a packet arrives from external router A at interface L:1 of leaf ASIC A. The destination IP address of the packet, 27.1.2.3, requires that the packet be sent to a network accessible through external router B. Leaf ASIC A examines the destination IP address of the packet and performs an LPM lookup in the non-overlapping portion of the routing table that is stored on leaf ASIC A, the result of the LPM lookup is the routing table entry shown in Table 5.

TABLE 5

| Routing Table Entry | | | |
|---|---|---|---|
| Network destination | Netmask | Next-hop IP address | Metric |
| 27.1.0.0 | 255.255.0.0 | 59.23.21.51 | 10 |

In this example, the portion of the routing table stored on leaf ASIC A includes a route entry for the destination IP address, 27.1.2.3, of the packet. The route entry for 27.1.2.3 includes the IP address of external router B, 59.32.21.51, as the next-hop IP address.

Leaf ASIC A then uses the next-hop IP address, 59.32.21.51, to perform a lookup in the host routes table. The host routes table for leaf ASIC A is as follows:

TABLE 6

| Host Routes Table | |
|---|---|
| Host Route | Destination MAC |
| 127.0.1.2 | (LPM lookup pointer MAC for Leaf ASIC B) |
| 127.0.1.3 | (LPM lookup pointer MAC for Leaf ASIC C) |
| 127.0.1.4 | (LPM lookup pointer MAC for Leaf ASIC D) |
| <External Router A IP> | <External Router A MAC Port L:1> |
| 59.32.21.51 | 01:1a:72:27:54:01 |
| (External Router B IP) | (External Router B MAC) |
| <External Router C IP> | <Assigned MAC for Leaf ASIC B Port L:1> |
| <External Router D IP> | <Assigned MAC for Leaf ASIC B Port L:2> |
| <External Router E IP> | <Assigned MAC for Leaf ASIC C Port L:1> |
| <External Router F IP> | <Assigned MAC for Leaf ASIC C Port L:2> |
| <External Router G IP> | <Assigned MAC for Leaf ASIC D Port L:1> |
| <External Router H IP> | <Assigned MAC for Leaf ASIC D Port L:2> |

Because external router B is locally connected leaf ASIC A, the entry in the host routes table of leaf ASIC A corresponding to the IP address of external router B includes the MAC address of external router B, 01:1a:72:27:54:01, which is rewritten as the destination MAC address of the packet. Leaf ASIC A then uses the egress table to match the destination MAC address with the appropriate egress interface. The egress table for leaf ASIC A is as follows:

TABLE 7

Egress Table for Leaf A

| MAC Address | Leaf ASIC A Egress Port |
|---|---|
| (LPM lookup pointer MAC for Leaf ASIC B) | L:3, L:4 |
| (LPM lookup pointer MAC for Leaf ASIC C) | L:3, L:4 |
| (LPM lookup pointer MAC for Leaf ASIC D) | L:3, L:4 |
| <External Router A MAC> 01:1a:72:27:54:01 | L:1 |
| (External Router B MAC) | L:2 |
| <Assigned MAC for Leaf ASIC B Port L:1> | L:3, L:4 |
| <Assigned MAC for Leaf ASIC B Port L:2> | L:3, L:4 |
| <Assigned MAC for Leaf ASIC C Port L:1> | L:3, L:4 |
| <Assigned MAC for Leaf ASIC C Port L:2> | L:3, L:4 |
| <Assigned MAC for Leaf ASIC D Port L:1> | L:3, L:4 |
| <Assigned MAC for Leaf ASIC D Port L:2> | L:3, L:4 |

In this example, as specified in the Egress Table for Leaf A, external router B is connected to interface L:2. The packet is then sent out of interface L:2 to external router B to continue its journey towards its destination IP address.

Figure 6B:
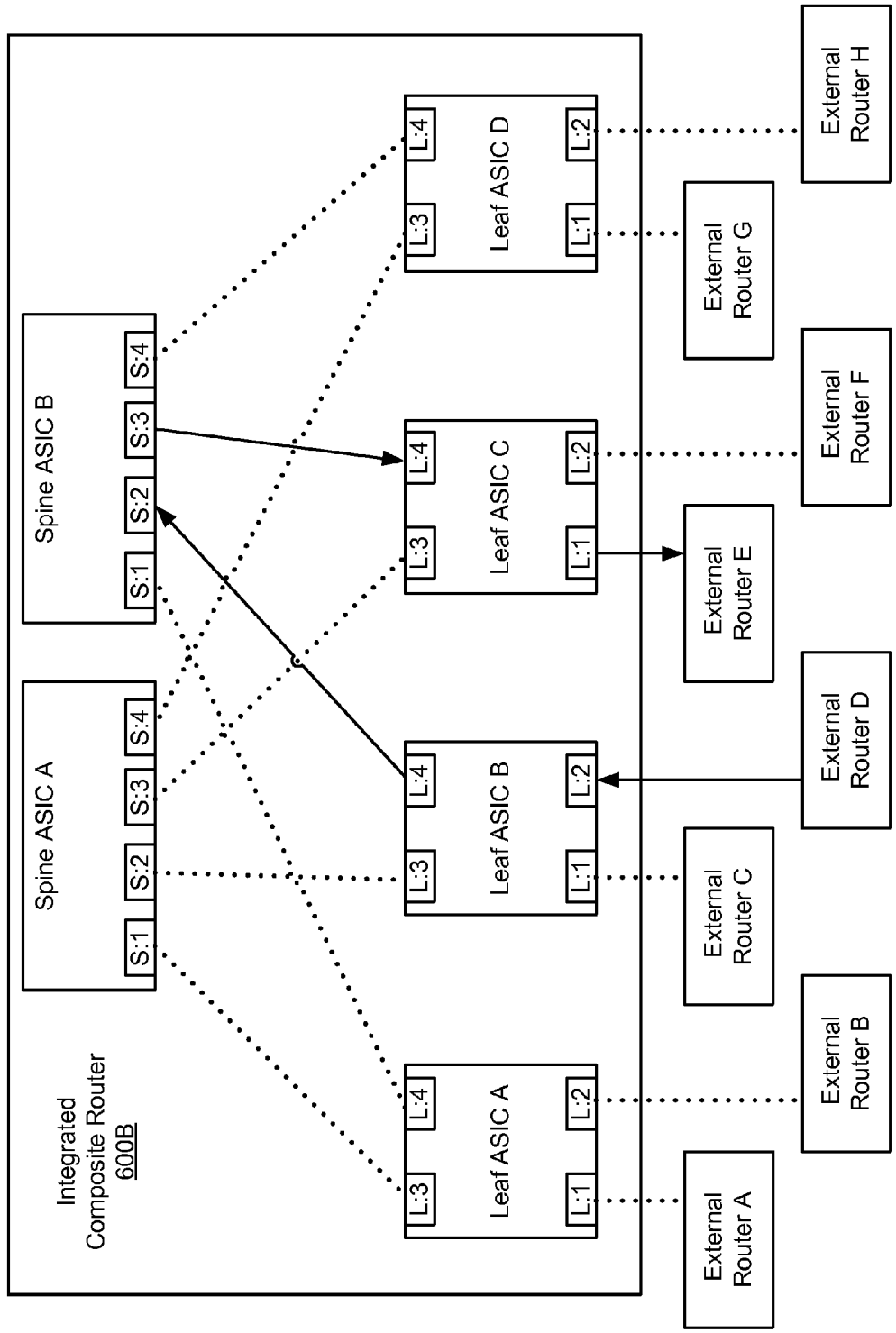

FIG. 6B shows an example in accordance with one or more embodiments of the invention. The example is not intended to limit the scope of the invention.

Referring to FIG. 6B, consider the scenario in which an integrated composite router is again deployed using two spine ASICs and four leaf ASICs, and each leaf ASIC is connected to two external routers. The integrated composite router in this scenario receives routing table information from all external routers, constructed a routing table and distributed the routing table evenly among the four leaf ASICs. Even distribution results in each leaf ASIC one-fourth of the routing table.

In this example, a packet arrives from external router D at interface L:2 of leaf ASIC B. The destination IP address of the packet, 132.1.3.2, requires that the packet be sent to a network accessible through external router E. Leaf ASIC B examines the destination IP address of the packet and performs an LPM lookup in the non-overlapping portion of the routing table that is stored on leaf ASIC B. In this example, the portion of the routing table stored on leaf ASIC B includes a route entry for the destination IP address, 132.1.3.2, of the packet. The route entry for 132.1.3.2 includes the IP address of external router E, 145.1.4.5, as the next-hop IP address. The routing table entry found for this example is as follows:

TABLE 8

Routing Table Entry

| Network destination | Netmask | Next-hop IP address | Metric |
|---|---|---|---|
| 132.1.0.0 | 255.255.0.0 | 145.1.4.5 | 10 |

Leaf ASIC B then uses the next-hop IP address, 145.1.4.5, to perform a lookup in the host routes table. The host routes table for leaf ASIC B is as follows:

TABLE 9

Host Routes Table

| Host Route | Destination MAC |
|---|---|
| 127.0.1.1 | (LPM lookup pointer MAC for Leaf ASIC A) |
| 127.0.1.3 | (LPM lookup pointer MAC for Leaf ASIC C) |
| 127.0.1.4 | (LPM lookup pointer MAC for Leaf ASIC D) |
| <External Router A IP> | <Assigned MAC for Leaf ASIC A Port L:1> |
| <External Router B IP> | <Assigned MAC for Leaf ASIC A Port L:2> |
| <External Router C IP> | <External Router A MAC Port L:1> |

TABLE 9-continued

Host Routes Table

| Host Route | Destination MAC |
|---|---|
| <External Router D IP> 145.1.4.5 | <External Router A MAC Port L:2> 00:1c:73:27:cc:01 |
| (External Router E IP) | (Assigned MAC for Leaf ASIC C Port L:1) |
| <External Router F IP> | <Assigned MAC for Leaf ASIC C Port L:2> |
| <External Router G IP> | <Assigned MAC for Leaf ASIC D Port L:1> |
| <External Router H IP> | <Assigned MAC for Leaf ASIC D Port L:2> |

External router E is not connected locally to an interface on leaf ASIC B, accordingly, the entry in the host routes table for 145.1.4.5 includes a MAC address that corresponds to port L:1 of leaf ASIC C, which is connected to external router E. This MAC address, 00:1c:73:27:cc:01, is written as the destination MAC address of the packet. Leaf ASIC B then uses the egress table to match the destination MAC address with the appropriate egress interface. The egress table for leaf ASIC B is as follows:

TABLE 10

Egress Table for Leaf B

| MAC Address | Leaf ASIC B Egress Port |
|---|---|
| (LPM lookup pointer MAC for Leaf ASIC A) | L:3, L:4 |
| (LPM lookup pointer MAC for Leaf ASIC C) | L:3, L:4 |
| (LPM lookup pointer MAC for Leaf ASIC D) | L:3, L:4 |
| <Assigned MAC for Leaf ASIC A Port L:1> | L:3, L:4 |
| <Assigned MAC for Leaf ASIC A Port L:2> | L:3, L:4 |
| <External Router C MAC> | L:1 |
| <External Router D MAC> 00:1c:73:27:cc:01 | L:2 |
| (Assigned MAC for Leaf ASIC C Port L:1) | L:3, L:4 |
| <Assigned MAC for Leaf ASIC C Port L:2> | L:3, L:4 |
| <Assigned MAC for Leaf ASIC D Port L:1> | L:3, L:4 |
| <Assigned MAC for Leaf ASIC D Port L:2> | L:3, L:4 |

In this example, because the destination MAC address 00:1c:73:27:cc:01 corresponds to an interface on another leaf ASIC, the egress table entry for 00:1c:73:27:cc:01 indicates that the egress port can be either L:3 or L:4 (i.e., an interface connected to a spine ASIC). Next, based on load balancing policies of the system, leaf ASIC B sends the packet to spine ASIC B from interface L:4.

Spine ASIC B uses the destination MAC address, 00:1c:73:27:cc:01, to perform a lookup in the forwarding table stored on spine ASIC B. The forwarding table on the spine ASICs is as follows:

TABLE 11

Spine forwarding Table

| Destination MAC of Incoming Packet | Spine Egress Port |
|---|---|
| (LPM lookup pointer MAC for Leaf ASIC A) | S:1 |
| (LPM lookup pointer MAC for Leaf ASIC B) | S:2 |
| (LPM lookup pointer MAC for Leaf ASIC C) | S:3 |
| (LPM lookup pointer MAC for Leaf ASIC D) | S:4 |
| <Assigned MAC for Leaf ASIC A Port L:1> | S:1 |
| <Assigned MAC for Leaf ASIC A Port L:2> | S:1 |
| <Assigned MAC for Leaf ASIC B Port L:1> | S:2 |
| <Assigned MAC for Leaf ASIC B Port L:2> | S:2 |
| 00:1c:73:27:cc:01 | S:3 |
| (Assigned MAC for Leaf ASIC C Port L:1) | |
| <Assigned MAC for Leaf ASIC C Port L:2> | S:3 |
| <Assigned MAC for Leaf ASIC D Port L:1> | S:4 |
| <Assigned MAC for Leaf ASIC D Port L:2> | S:4 |

The forwarding table includes an entry corresponding to 00:1c:73:27:cc:01 that indicates that the packet should be forwarded out of interface S:3 of spine ASIC B, which is connected to interface L:4 of leaf ASIC C. Spine ASIC B then forwards the packet to leaf ASIC C.

When the packet arrives at leaf ASIC C, it includes its original destination IP address and the destination MAC address written by leaf ASIC B that corresponds to port L:1 of leaf ASIC C. Leaf ASIC C subsequently performs a lookup in the MAC pointer table stored on leaf ASIC C. The MAC pointer table for leaf ASIC C is as follows:

TABLE 12

MAC Pointer Table for Leaf ASIC C

| Destination MAC of Incoming Packet | Action |
|---|---|
| (LPM lookup pointer MAC f or Leaf ASIC C) | Perform LPM lookup |
| 00: 1c:73:27:cc:01 (Assigned MAC for Leaf ASIC C Port L:1) | Rewrite destination MAC address as External Router E MAC address |
| <Assigned MAC for Leaf ASIC C Port L:2> | Rewrite destination MAC address as External Router F MAC address |

The MAC address 00:1c:73:27:cc:01 has an entry in the MAC pointer table that includes the MAC address of external router E, which is rewritten as the destination MAC address of the packet. Leaf ASIC C then examines the egress table using the MAC address of external router E. The egress table for leaf ASIC C is as follows:

TABLE 13

Egress Table for Leaf C

| MAC Address | Leaf ASIC C Egress Port |
|---|---|
| (LPM lookup pointer MAC for Leaf ASIC A) | L:3, L:4 |
| (LPM lookup pointer MAC for Leaf ASIC C) | L:3, L:4 |
| (LPM lookup pointer MAC for Leaf ASIC D) | L:3, L:4 |
| <Assigned MAC for Leaf ASIC A Port L:1> | L:3, L:4 |
| <Assigned MAC for Leaf ASIC A Port L:2> | L:3, L:4 |
| <Assigned MAC for Leaf ASIC B Port L:1> | L:3, L:4 |
| <Assigned MAC for Leaf ASIC B Port L:2> | L:3, L:4 |
| <External Router E MAC> | L:1 |
| <External Router F MAC> | L:2 |
| <Assigned MAC for Leaf ASIC D Port L:1> | L:3, L:4 |
| <Assigned MAC for Leaf ASIC D Port L:2> | L:3, L:4 |

The entry in the egress table for the MAC address of external router E includes interface L:1 as the interface from which the packet is to be sent. The packet is then sent out of interface L:1 to external router E to continue its journey towards its destination IP address.

Figure 6C:
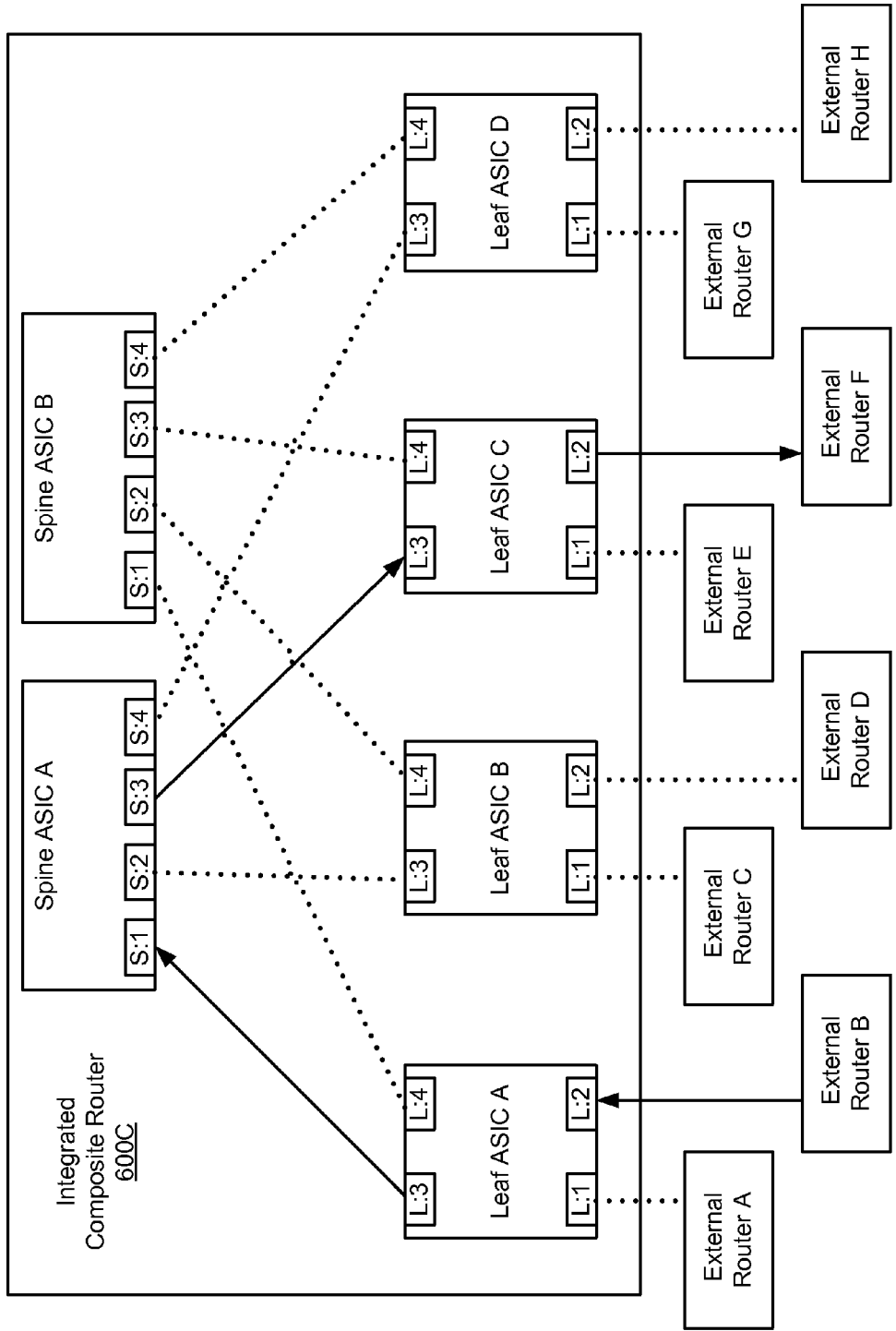

FIG. 6C shows an example in accordance with one or more embodiments of the invention. The example is not intended to limit the scope of the invention.

Referring to FIG. 6C, consider the scenario in which an integrated composite router is deployed using two spine ASICs and four leaf ASICs, and each leaf ASIC is connected to two external routers. The composite router in this scenario has received routing table information from all external routers, constructed a routing table and distributed the routing table evenly among the four leaf ASICs. Even distribution results in each leaf ASIC one-fourth of the routing table.

In this example, a packet arrives from external router B at interface L:2 of leaf ASIC A. The destination IP address of the packet, 142.15.27.3, requires the packet to be sent to a network accessible through external router F. Leaf ASIC A examines the destination IP address of the packet and performs a lookup in the non-overlapping portion of the routing table that is stored on leaf ASIC A. In this example, the non-overlapping portion of the routing table stored on leaf ASIC A does not include a route entry for the destination IP address, 142.15.27.3, of the packet. Leaf ASIC A then performs a supernet table lookup and determines that leaf ASIC C includes the portion of the routing table that includes the range of IP addresses that includes 142.15.27.3. The supernet table for leaf ASIC A is as follows:

TABLE 14

Supernet Table of Leaf ASIC A

| IP address ranges | Leaf ASIC to forward packet to | Next-hop MAC address |
|---|---|---|
| 64.0.0.0/8-127.0.0.0/8 | Leaf ASIC B | 00:1c:73:bb:bb:05 |
| 128.0.0.0/8-191.0.0.0/8 | Leaf ASIC C | 00:1c:73:cc:cc:09 |
| 192.0.0.0/8-254.0.0.0/8 | Leaf ASIC D | 00:1c:73:dd:dd:0d |

Leaf ASIC A then rewrites the destination MAC address of the packet to 00:1c:73:cc:cc:09, which corresponds to leaf ASIC C. Leaf ASIC A then examines the egress table using the LPM lookup pointer MAC address corresponding to leaf ASIC C. The egress table for leaf ASIC A is as follows:

TABLE 15

Egress Table for Leaf A

| MAC Address | Leaf ASIC A Egress Port |
|---|---|
| (LPM lookup pointer MAC for Leaf ASIC A) | L:3, L:4 |
| 00:1c:73:cc:cc:09 (LPM lookup pointer MAC for Leaf ASIC C) | L:3, L:4 |
| (LPM lookup pointer MAC for Leaf ASIC D) | L:3, L:4 |
| <External Router A MAC> | L:1 |
| <External Router B MAC> | L:2 |
| <Assigned MAC for Leaf ASIC B Port L:1> | L:3, L:4 |
| <Assigned MAC for Leaf ASIC B Port L:2> | L:3, L:4 |
| <Assigned MAC for Leaf ASIC C Port L:1> | L:3, L:4 |
| <Assigned MAC for Leaf ASIC C Port L:2> | L:3, L:4 |
| <Assigned MAC for Leaf ASIC D Port L:1> | L:3, L:4 |
| <Assigned MAC for Leaf ASIC D Port L:2> | L:3, L:4 |

Leaf ASIC A then, based on load balancing policies of the system, sends the packet to spine ASIC A. Spine ASIC A uses the destination MAC address, 00:1c:73:cc:cc:09, to perform a lookup in the forwarding table stored on spine ASIC A (see, e.g., Table 11 above). The forwarding table includes an entry corresponding to 00:1c:73:cc:cc:09 that indicates that the packet should be forwarded out of interface S:3 of spine ASIC A, which is connected to interface L:3 of leaf ASIC C. Spine ASIC A then forwards the packet to leaf ASIC C.

When the packet arrives at leaf ASIC C it includes its original destination IP address, 142.15.27.3, and the destination MAC address written by leaf ASIC A that informs leaf ASIC C to perform a lookup in the non-overlapping portion of the routing table stored on leaf ASIC C. Leaf ASIC C subsequently performs a lookup in the MAC pointer table stored on leaf ASIC C. The MAC pointer table for leaf ASIC C is as follows:

TABLE 16

MAC Pointer Table for Leaf ASIC C

| Destination MAC of Incoming Packet | Action |
|---|---|
| 00:1c:73:cc:cc:09 (LPM lookup pointer MAC for Leaf ASIC C) | Perform LPM lookup |
| <Assigned MAC for Leaf ASIC C Port L:1> | Rewrite destination MAC address as External Router E MAC address |
| <Assigned MAC for Leaf ASIC C Port L:2> | Rewrite destination MAC address as External Router F MAC address |

The MAC address 00:1c:73:cc:cc:09 has an entry in the MAC pointer table that includes a pointer to the portion of the routing table stored in leaf ASIC C.

Leaf ASIC C then uses the destination IP address of the packet to perform an LPM lookup in the portion of the routing table stored in leaf ASIC C. A route entry is found because leaf ASIC A correctly identified leaf ASIC C as having the correct portion of the routing table that includes an entry corresponding to 142.15.27.3. The routing table entry found for this example is as follows:

TABLE 17

Routing Table Entry

| Network destination | Netmask | Next-hop IP address | Metric |
|---|---|---|---|
| 142.0.0.0 | 255.0.0.0 | 142.23.1.5 | 10 |

The route entry corresponding to 142.15.27.3 includes next-hop IP address information identifying the next-hop IP address as the IP address of external router F, 142.23.1.5, which is connected to interface L:2 leaf ASIC C. Leaf ASIC C then uses the next-hop IP address to perform a lookup in the host routes table. The host routes table for leaf ASIC C is as follows:

TABLE 18

Host Routes Table

| Host Route | Destination MAC |
|---|---|
| 127.0.1.1 | (LPM lookup pointer MAC for Leaf ASIC A) |
| 127.0.1.2 | (LPM lookup pointer MAC for Leaf ASIC B) |
| 127.0.1.4 | (LPM lookup pointer MAC for Leaf ASIC D) |
| <External Router A IP> | <Assigned MAC for Leaf ASIC A Port L:1> |
| <External Router B IP> | <Assigned MAC for Leaf ASIC A Port L:2> |
| <External Router C IP> | <Assigned MAC for Leaf ASIC B Port L:1> |
| <External Router D IP> | <Assigned MAC for Leaf ASIC B Port L:2> |
| <External Router E IP> | <External Router E MAC> |
| 142.23.1.5 (External Router F IP) | <External Router F MAC> |
| <External Router G IP> | <Assigned MAC for Leaf ASIC D Port L:1> |
| <External Router H IP> | <Assigned MAC for Leaf ASIC D Port L:2> |

Because external router F is locally connected to an interface of leaf ASIC C, the entry in the host routes table corresponding to the IP address of external router F, 142.23.1.5, includes the MAC address of external router F. Leaf ASIC C then rewrites the MAC address of external router F as the destination MAC address of the packet.

Leaf ASIC C then examines the egress table using the MAC address of external router F. The egress table for leaf ASIC C is as follows:

TABLE 19

Egress Table for Leaf C

| MAC Address | Leaf ASIC C Egress Port |
|---|---|
| (LPM lookup pointer MAC for Leaf ASIC A) | L:3, L:4 |
| (LPM lookup pointer MAC for Leaf ASIC C) | L:3, L:4 |
| (LPM lookup pointer MAC for Leaf ASIC D) | L:3, L:4 |
| <Assigned MAC for Leaf ASIC A Port L:1> | L:3, L:4 |
| <Assigned MAC for Leaf ASIC A Port L:2> | L:3, L:4 |
| <Assigned MAC for Leaf ASIC B Port L:1> | L:3, L:4 |
| <Assigned MAC for Leaf ASIC B Port L:2> | L:3, L:4 |
| <External Router E MAC> | L:1 |
| <External Router F MAC> | L:2 |
| <Assigned MAC for Leaf ASIC D Port L:1> | L:3, L:4 |
| <Assigned MAC for Leaf ASIC D Port L:2> | L:3, L:4 |

The entry in the egress table for the MAC address of external router F includes interface L:2 as the interface from which the packet is to be sent. The packet is then sent out of interface L:2 to external router F to continue its journey towards its destination IP address.

Figure 6D:
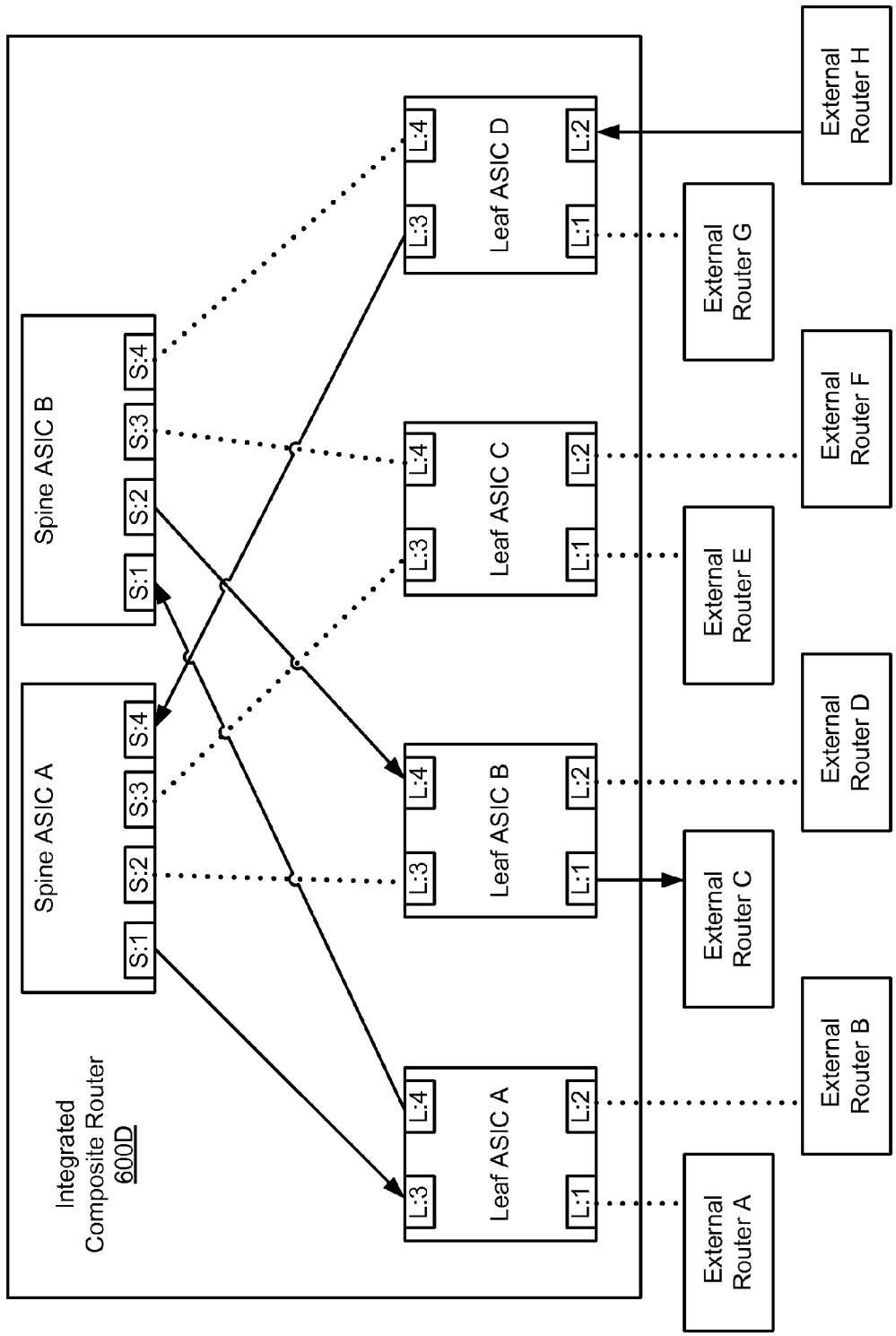

FIG. 6D shows an example in accordance with one or more embodiments of the invention. The example is not intended to limit the scope of the invention.

Referring to FIG. 6D, consider the scenario in which an integrated composite router is deployed using two spine ASICs and four leaf ASICs, and each leaf ASIC is connected to two external routers. The integrated composite router in this scenario has received routing table information from all external routers, constructed a routing table and distributed the routing table evenly among the four leaf ASICs. Even distribution results in each leaf ASIC one-fourth of the routing table In this example, a packet arrives from external router H at interface L:2 of leaf ASIC D. The destination IP address of the packet, 39.54.32.1, requires the packet to be sent to a network accessible through external router C. Leaf ASIC D examines the destination IP address of the packet and performs an LPM lookup in the portion of the routing table that is stored on leaf ASIC D. In this example, the portion of the routing table stored on leaf ASIC D does not include a route entry for the destination IP address, 39.54.32.1, of the packet.

Leaf ASIC D then performs a supernet table lookup. The supernet table for leaf ASIC D is as follows:

TABLE 20

Supernet Table of Leaf ASIC D

| IP address ranges | Leaf ASIC to forward packet to | Next-hop MAC address |
|---|---|---|
| 0.0.0.0/8-63.0.0.0/8 | Leaf ASIC A | 00:1c:73:aa:aa:01 |
| 64.0.0.0/8-127.0.0.0/8 | Leaf ASIC B | 00:1c:73:bb:bb:05 |
| 128.0.0.0/8-191.0.0.0/8 | Leaf ASIC C | 00:1c:73:cc:cc:09 |

In this example, it is determined that leaf ASIC A includes the portion of the routing table that includes the range of IP addresses that includes 39.54.32.1. Leaf ASIC D then rewrites the destination MAC address of the packet to 00:1c:73:aa:aa:01, which corresponds to leaf ASIC A. Leaf ASIC D then examines the egress table using the next-hop MAC address corresponding to leaf ASIC A. The egress table for leaf ASIC D is as follows:

TABLE 21

Egress Table for Leaf D

| MAC Address | Leaf ASIC D Egress Port |
|---|---|
| 00:1c:73:aa:aa:01 (LPM lookup pointer MAC for Leaf ASIC A) | L:3, L:4 |
| (LPM lookup pointer MAC for Leaf ASIC C) | L:3, L:4 |
| (LPM lookup pointer MAC for Leaf ASIC D) | L:3, L:4 |
| <Assigned MAC for Leaf ASIC A Port L:1> | L:3, L:4 |
| <Assigned MAC for Leaf ASIC A Port L:2> | L:3, L:4 |
| <Assigned MAC for Leaf ASIC B Port L:1> | L:3, L:4 |
| <Assigned MAC for Leaf ASIC B Port L:2> | L:3, L:4 |
| <Assigned MAC for Leaf ASIC C Port L:1> | L:3, L:4 |
| <Assigned MAC for Leaf ASIC C Port L:2> | L:3, L:4 |
| <External Router G MAC> | L:1 |
| <External Router H MAC> | L:2 |

Leaf ASIC D then, based on load balancing policies of the system, sends the packet to spine ASIC A. Spine ASIC A uses the destination MAC address, 00:1c:73:aa:aa:01, to perform a lookup in the forwarding table stored on spine ASIC A. The forwarding table includes an entry corresponding to 00:1c:73:aa:aa:01 that indicates that the packet should be forwarded out of interface S:1 of spine ASIC A, which is connected to interface L:3 of leaf ASIC A (see, e.g., Table 11 above). Spine ASIC A then forwards the packet to leaf ASIC A.

When the packet arrives at leaf ASIC A, it includes its original destination IP address, 39.54.32.1, and the destination MAC address written by leaf ASIC D that informs leaf ASIC A to perform a lookup in the non-overlapping portion of the routing table stored on leaf ASIC A. Leaf ASIC A subsequently performs a lookup in the MAC pointer table stored on leaf ASIC A. The MAC pointer table for leaf ASIC A, in this example, is as follows:

TABLE 22

MAC Pointer Table for Leaf ASIC A

| Destination MAC of Incoming Packet | Action |
|---|---|
| 00:1c:73:aa:aa:01 (LPM lookup pointer MAC for Leaf ASIC A) | Perform LPM lookup |
| <Assigned MAC for Leaf ASIC A Port L:1> | Rewrite destination MAC address as External Router E MAC address |
| <Assigned MAC for Leaf ASIC A Port L:2> | Rewrite destination MAC address as External Router F MAC address |

The MAC address 00:1c:73:aa:aa:01 has an entry in the MAC pointer table that includes a pointer to the non-overlapping portion of the routing table stored in leaf ASIC A. Leaf ASIC A then uses the destination IP address of the packet to perform a lookup in the portion of the routing table stored in leaf ASIC A. A route entry is found because leaf ASIC D correctly identified leaf ASIC A as having the correct portion of the routing table that includes an entry corresponding to 39.54.32.1. The routing table entry found for this example is as follows:

TABLE 23

Routing Table Entry

| Network destination | Netmask | Next-hop IP address | Metric |
|---|---|---|---|
| 39.0.0.0 | 255.0.0.0 | 39.159.213.54 | 10 |

The route entry for 39.54.32.1 includes next-hop IP address information identifying the next-hop IP address as the IP address of external router C, 39.159.213.54, which is connected to leaf ASIC B. Leaf ASIC A then uses the next-hop IP address to perform a lookup in the host routes table. The host routes table for leaf ASIC A is as follows:

TABLE 24

Host Routes Table

| Host Route | Destination MAC |
|---|---|
| 127.0.1.2 | (LPM lookup pointer MAC for Leaf ASIC B) |
| 127.0.1.3 | (LPM lookup pointer MAC for Leaf ASIC C) |
| 127.0.1.4 | (LPM lookup pointer MAC for Leaf ASIC D) |
| <External Router A IP> | <External Router A MAC> |
| <External Router B IP> | <External Router B MAC> |
| 39.159.213.54 (External Router C IP) | 00:1c:73:27:bb:01 (Assigned MAC for Leaf ASIC B Port L:1) |
| <External Router D IP> | <Assigned MAC for Leaf ASIC B Port L:2> |
| <External Router E IP> | <Assigned MAC for Leaf ASIC C Port L:1> |
| <External Router F IP> | <Assigned MAC for Leaf ASIC C Port L:2> |
| <External Router G IP> | <Assigned MAC for Leaf ASIC D Port L:1> |
| <External Router H IP> | <Assigned MAC for Leaf ASIC D Port L:2> |

The entry in the host routes table corresponding to the IP address of external router C includes a destination MAC address of 00:1c:73:27:bb:01.

Leaf ASIC A then rewrites the destination MAC address of the packet as 00:1c:73:27:bb:01. Leaf ASIC A then examines the egress table. The egress table for leaf ASIC A is as follows:

TABLE 25

Egress Table for Leaf A

| MAC Address | Leaf ASIC A Egress Port |
|---|---|
| (LPM lookup pointer MAC for Leaf ASIC B) | L:3, L:4 |
| (LPM lookup pointer MAC for Leaf ASIC C) | L:3, L:4 |
| (LPM lookup pointer MAC for Leaf ASIC D) | L:3, L:4 |
| <External Router A MAC> | L:1 |
| <External Router B MAC> | L:2 |
| 00:1c:73:27:bb:01 (Assigned MAC for Leaf ASIC B Port L:1) | L:3, L:4 |
| <Assigned MAC for Leaf ASIC B Port L:2> | L:3, L:4 |
| <Assigned MAC for Leaf ASIC C Port L:1> | L:3, L:4 |
| <Assigned MAC for Leaf ASIC C Port L:2> | L:3, L:4 |
| <Assigned MAC for Leaf ASIC D Port L:1> | L:3, L:4 |
| <Assigned MAC for Leaf ASIC D Port L:2> | L:3, L:4 |

The entry in the egress table corresponding to 00:1c:73:27:bb:01 indicates that the packet is to be sent from interface L:3 or L:4 of leaf switch A. Leaf ASIC A then sends the packet, based on load balancing policies of the system, to spine ASIC B from interface L:4. Spine ASIC B uses the destination MAC address, 00:1c:73:27:bb:01, to perform a lookup in the forwarding table stored on spine ASIC B (see, e.g., Table 11 above). The forwarding table includes an entry corresponding to 00:1c:73:27:bb:01 that indicates that the packet should be forwarded out of interface S:2 of spine ASIC B, which is connected to interface L:4 of leaf ASIC B. Spine ASIC B then forwards the packet to leaf ASIC B.

When the packet arrives at leaf ASIC B, it includes its original destination IP address, 39.54.32.1 and the destination MAC address written by leaf ASIC A, 00:1c:73:27:bb:01, that corresponds to port L:1 of leaf ASIC B. Leaf ASIC B subsequently performs a lookup in the MAC pointer table stored on leaf ASIC B. The MAC pointer table for leaf ASIC B, in this example, is as follows:

TABLE 26

MAC Pointer Table for Leaf ASIC B

| Destination MAC of Incoming Packet | Action |
|---|---|
| (LPM lookup pointer MAC for Leaf ASIC B) | Perform LPM lookup |
| 00:1c:73:27:bb:01 (Assigned MAC for Leaf ASIC B Port L:1) | Rewrite destination MAC address as External Router C MAC address |
| <Assigned MAC for Leaf ASIC B Port L:2> | Rewrite destination MAC address as External Router D MAC address |

The MAC address 00:1c:73:27:bb:01 has an entry in the MAC pointer table that includes the MAC address of external router C, which is rewritten as the destination MAC address of the packet. Leaf ASIC B then examines the egress table using the MAC address of external router C. The egress table for leaf ASIC B is as follows:

TABLE 27

Egress Table for Leaf B

| MAC Address | Leaf ASIC A Egress Port |
|---|---|
| (LPM lookup pointer MAC for Leaf ASIC A) | L:3, L:4 |
| (LPM lookup pointer MAC for Leaf ASIC C) | L:3, L:4 |
| (LPM lookup pointer MAC for Leaf ASIC D) | L:3, L:4 |
| <Assigned MAC for Leaf ASIC A Port L:1> | L:3, L:4 |
| <Assigned MAC for Leaf ASIC A Port L:2> | L:3, L:4 |
| <External Router C MAC> | L:1 |
| <External Router D MAC> | L:2 |
| <Assigned MAC for Leaf ASIC C Port L:1> | L:3, L:4 |
| <Assigned MAC for Leaf ASIC C Port L:2> | L:3, L:4 |
| <Assigned MAC for Leaf ASIC D Port L:1> | L:3, L:4 |
| <Assigned MAC for Leaf ASIC D Port L:2> | L:3, L:4 |

The entry in the egress table for the MAC address of external router C includes interface L:1 as the interface from which the packet is to be sent. The packet is then sent out of interface L:1 to external router C to continue its journey towards its destination IP address.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing packets, the method comprising:
receiving, at an interface of a first network device of a plurality of network devices in a leaf tier, a first packet, wherein the first packet comprises a first destination Internet Protocol (IP) address and wherein each of the plurality of network devices comprises a supernet table and a non-overlapping portion of a routing table;
determining, using the first destination IP address and the supernet table, a first IP address of a second network device to which the packet is to be sent, wherein the second network device is one of the plurality of network devices in the leaf tier, wherein the supernet table comprises a plurality of entries, wherein each of the plurality of entries comprises a non-overlapping IP address range and specifies a corresponding one of the plurality of network devices in the leaf tier, and wherein the non-overlapping portion of the routing table on the second network device comprises a route for the first packet;
determining, by the first network device, a first media access control (MAC) address of the second network device using the first IP address;
rewriting, by the first network device, the first packet to obtain a first rewritten packet, wherein the first rewritten packet comprises the first MAC address as a destination MAC address of the first rewritten packet and the first destination IP address;
sending the first rewritten packet to a third network device, wherein the third network device is not in the leaf tier;
determining, by the third network device using the destination MAC address of the first rewritten packet, to forward the first rewritten packet from the third network device to the second network device;
sending the first rewritten packet to the second network device;
performing, by the second network device using the destination MAC address of the first rewritten packet, a first MAC pointer table lookup to determine that a first routing table lookup is to be performed using the first destination IP address of the first rewritten packet;
performing, by the second network device, the first routing table lookup, wherein the first routing table lookup comprises using the non-overlapping portion of the routing table on the second network device to determine a second IP address corresponding to a first external network device to which the packet is to be sent;
determining, by the second network device, a second MAC address of the first external network device using the second IP address;
rewriting the first rewritten packet to obtain a second rewritten packet, by the second network device using the second MAC address, wherein the second rewritten packet comprises the second MAC address as a destination MAC address of the second rewritten packet and the first destination IP address;
sending the second rewritten packet from a first interface on the second network device to the first external network device, wherein the first interface is associated with the second MAC address.

2. The method of claim 1, further comprising:
receiving, at the interface of the first network device, a second packet, wherein the second packet comprises a second destination IP address;
performing, by the first network device, a second routing table lookup, wherein the second routing table lookup comprises using the non-overlapping portion of the routing table on the first network device to determine a third IP address corresponding to a second external network device to which the second packet is to be sent;
determining, by the first network device using the third IP address, a third MAC address corresponding to the second network device;
rewriting the second packet to obtain a third rewritten packet, wherein the third rewritten packet comprises the third MAC address as the destination MAC address of the third rewritten packet and the second destination IP address;
sending the third rewritten packet to the third network device;
determining, by the third network device using the destination MAC address of the third rewritten packet, to forward the third rewritten packet from the third network device to the second network device;
sending the third rewritten packet to the second network device;

performing, by the second network device using the destination MAC address of the third rewritten packet, a second MAC pointer table lookup to determine a fourth MAC address corresponding to the second external network device;

rewriting the third rewritten packet to obtain a fourth rewritten packet, wherein the fourth rewritten packet comprises the fourth MAC address as the destination MAC address of the fourth rewritten packet and the second destination IP address;

sending the fourth rewritten packet from a second interface of the second network device, wherein the second interface of the second network device is associated with the fourth MAC address.

3. The method of claim 1, further comprising:

receiving, at the interface of the first network device, a second packet, wherein the second packet comprises a second destination IP address;

determining, using the second destination IP address and the supernet table, the first IP address of the second network device to which the packet is to be sent, wherein the second network device is one of the plurality of network devices in the leaf tier and wherein the non-overlapping portion of the routing table on the second network device comprises a route for the second packet;

determining, by the first network device, the first MAC address of the second network device using the first IP address;

rewriting, by the first network device, the second packet to obtain a third rewritten packet, wherein the third rewritten packet comprises the first MAC address as the destination MAC address of the third rewritten packet and the second destination IP address;

sending the third rewritten packet to the third network device;

determining, by the third network device using the destination MAC address of the third rewritten packet, to forward the third rewritten packet from the third network device to the second network device;

sending the third rewritten packet to the second network device;

performing, by the second network device using the destination MAC address of the third rewritten packet, a second MAC pointer table lookup to determine that a second routing table lookup is to be performed using the second destination IP address of the third rewritten packet;

performing, by the second network device, the second routing table lookup, wherein the second routing table lookup comprises using the non-overlapping portion of the routing table on the second network device to determine a third IP address corresponding to a second external network device to which the third rewritten packet is to be sent;

determining, by the second network device using the third IP address, a third MAC address corresponding to a fourth network device, wherein the fourth network device is one of the plurality of network devices in the leaf tier and wherein the fourth network device comprises an interface of the fourth network device connected to the second external network device;

rewriting the third rewritten packet to obtain a fourth rewritten packet, wherein the fourth rewritten packet comprises the third MAC address as the destination MAC address of the fourth rewritten packet and the second destination IP address;

sending the fourth rewritten packet to the third network device;

determining, by the third network device using the destination MAC address of the fourth rewritten packet, to forward the fourth rewritten packet from the third network device to the fourth network device;

sending the fourth rewritten packet to the fourth network device;

performing, by the fourth network device using the destination MAC address of the fourth rewritten packet, a third MAC pointer table lookup to determine a fourth MAC address corresponding to the second external network device;

rewriting the fourth rewritten packet to obtain a fifth rewritten packet, wherein the fifth rewritten packet comprises the fourth MAC address as the destination MAC address of the fifth rewritten packet and the second destination IP address;

sending the fifth rewritten packet from the interface of the fourth network device, wherein the interface of the fourth network device is associated with the fourth MAC address.

4. The method of claim 1, further comprising:

receiving, at the interface of the first network device, a second packet, wherein the second packet comprises a second destination IP address;

performing, by the first network device, a second routing table lookup, wherein the second routing table lookup comprises using the non-overlapping portion of the routing table on the first network device to determine a third IP address corresponding to a second external network device to which the second packet is to be sent;

determining, by the first network device using the third IP address, a third MAC address corresponding to a second external network device;

rewriting the second packet to obtain a third rewritten packet, wherein the third rewritten packet comprises the third MAC address as the destination MAC address of the third rewritten packet and the second destination IP address;

sending the third rewritten packet from a second interface of the first network device, wherein the second interface of the first network device is associated with the third MAC address.

5. The method of claim 1, further comprising:

receiving, at the integrated composite router, routing table information from a plurality of external network devices, wherein routing table information comprises routes;

constructing, from the received routing table information, the routing table;

distributing one of the non-overlapping portions of the routing table to each of the plurality of network devices in the leaf tier.

6. The method of claim 1, wherein performing the first routing table lookup further comprises determining a longest prefix match (LPM) for the first destination IP address.

7. The method of claim 1, wherein the routing table is a full Internet routing table.

8. An integrated composite router, comprising:

a plurality of leaf network devices comprising a first network device and a second network device, wherein the leaf network devices are connected to a third network device and wherein each of the plurality of leaf network devices comprise a supernet table and a non-overlapping portion of a routing table;

wherein the first network device is configured to:
  receive, at an interface of the first network device, a first packet, wherein the first packet comprises a first destination Internet Protocol (IP) address;
  determine, using the first destination IP address and a supernet table of the first network device, a first IP address of the second network device to which the packet is to be sent, wherein the supernet table of the first network device comprises a plurality of entries, wherein each of the plurality of entries comprises a non-overlapping IP address range and specifies a corresponding one of the plurality of leaf network devices;
  determine, by the first network device, a first media access control (MAC) address of the second network device using the first IP address;
  rewrite, by the first network device, the first packet to obtain a first rewritten packet, wherein the first rewritten packet comprises the first MAC address as a destination MAC address of the first rewritten packet and the first destination IP address;
  send the first rewritten packet to a third network device, wherein the third network device is not in the leaf tier;
wherein the second network device comprises the non-overlapping portion of the routing table on the second network device which comprises a route for the first packet, and wherein the second network device is configured to:
  perform, using the destination MAC address of the first rewritten packet, a first MAC pointer table lookup to determine that a first routing table lookup is to be performed using the first destination IP address of the first rewritten packet;
  perform the first routing table lookup, wherein the first routing table lookup comprises using the non-overlapping portion of the routing table on the second network device to determine a second IP address corresponding to a first external network device to which the packet is to be sent;
  determine a second MAC address of the first external network device using the second IP address;
  rewrite the first rewritten packet to obtain a second rewritten packet, using the second MAC address, wherein the second rewritten packet comprises the second MAC address as a destination MAC address of the second rewritten packet and the first destination IP address;
  send the second rewritten packet from a first interface on the second network device to the first external network device, where the first interface on the second network device is associated with the second MAC address; and
wherein the third network device comprises a forwarding table and is configured to:
  determine, using the destination MAC address of the first rewritten packet and the forwarding table, to forward the first rewritten packet from the third network device to the second network device;
  send the first rewritten packet to the second network device.

9. The integrated composite router of claim 8,
wherein the first network device is further configured to:
  receive, at the interface of the first network device, a second packet, wherein the second packet comprises a second destination IP address;
  perform, by the first network device, a second routing table lookup, wherein the second routing table lookup comprises using the non-overlapping portion of the routing table on the first network device to determine a third IP address corresponding to a second external network device to which the second packet is to be sent;
  determine, by the first network device using the third IP address, a third MAC address corresponding to the second network device;
  rewrite the second packet to obtain a third rewritten packet, wherein the third rewritten packet comprises the third MAC address as the destination MAC address of the third rewritten packet and the second destination IP address; and
  send the third rewritten packet to the third network device;
wherein the second network device is further configured to:
  perform, using the destination MAC address of the third rewritten packet, a second MAC pointer table lookup to determine a fourth MAC address corresponding to the second external network device;
  rewrite the third rewritten packet to obtain a fourth rewritten packet, wherein the fourth rewritten packet comprises the fourth MAC address as the destination MAC address of the fourth rewritten packet and the second destination IP address; and
  send the fourth rewritten packet from a second interface of the second network device, wherein the second interface of the second network device is associated with the fourth MAC address; and
wherein the third network device is further configured to:
  determine, using the destination MAC address of the third rewritten packet, to forward the third rewritten packet from the third network device to the second network device; and
  send the third rewritten packet to the second network device.

10. The integrated composite router of claim 8, further comprising a fourth network device of the plurality of leaf network devices; and
wherein the first network device is further configured to:
  receive, at the interface of the first network device, a second packet, wherein the second packet comprises a second destination IP address;
  determine, using the second destination IP address and the supernet table, the first IP address of the second network device to which the packet is to be sent, wherein the second network device is one of the plurality of network devices in the leaf tier and wherein the non-overlapping portion of the routing table on the second network device comprises a route for the second packet;
  determine, by the first network device, the first MAC address of the second network device using the first IP address;
  rewrite, by the first network device, the second packet to obtain a third rewritten packet, wherein the third rewritten packet comprises the first MAC address as the destination MAC address of the third rewritten packet and the second destination IP address;
  send the third rewritten packet to the third network device;
wherein the second network device is further configured to:
  perform, using the destination MAC address of the third rewritten packet, a second MAC pointer table lookup to determine that a second routing table lookup is to be performed on the second destination IP address of the third rewritten packet;

perform the second routing table lookup, wherein the second routing table lookup comprises using the non-overlapping portion of the routing table on the second network device to determine a third IP address corresponding to a second external network device to which the third rewritten packet is to be sent;

determine, using the third IP address, a third MAC address corresponding to a fourth network device, wherein the fourth network device is one of the plurality of network devices in the leaf tier and wherein the fourth network device comprises an interface of the fourth network device connected to the second external network device;

rewrite the third rewritten packet to obtain a fourth rewritten packet, wherein the fourth rewritten packet comprises the third MAC address as the destination MAC address of the fourth rewritten packet and the second destination IP address;

send the fourth rewritten packet to the third network device;

wherein the third network device is further configured to:
determine, using the destination MAC address of the third rewritten packet, to forward the third rewritten packet from the third network device to the second network device;

send the third rewritten packet to the second network device;

determine, using the destination MAC address of the fourth rewritten packet, to forward the fourth rewritten packet from the third network device to the fourth network device;

send the fourth rewritten packet to the fourth network device; and wherein the fourth network device is configured to:
perform, using the destination MAC address of the fourth rewritten packet, a third MAC pointer table lookup to determine a fourth MAC address corresponding to the second external network device;

rewrite the fourth rewritten packet to obtain a fifth rewritten packet, wherein the fifth rewritten packet comprises the fourth MAC address as the destination MAC address of the fifth rewritten packet and the second destination IP address;

send the fifth rewritten packet from the interface of the fourth network device, wherein the interface of the fourth network device is associated with the fourth MAC address.

11. The integrated composite router of claim 8, wherein the first network device, the second network device, and the third network device each comprise an application specific integrated circuit (ASIC).

12. The integrated composite router of claim 11, wherein the first network device, the second network device, and the third network device are integrated in a single physical device.

13. The integrated composite router of claim 11, wherein each of the ASICs is configured to perform the functionality of one selected from a group consisting of a layer two (L2) switch and a multi-layer switch.

14. The integrated composite router of claim 8, wherein the third network device is one of a plurality of spine network devices and wherein each of the network devices in the plurality of leaf network devices is connected to each of the devices in the plurality of spine devices.

15. The integrated composite router of claim 8, wherein each leaf network device in the plurality of leaf network devices comprises a host routes table, wherein the host routes table comprises a host routes table entry, and wherein the host routes table entry of the first network device comprises the first IP address and the first MAC address.

16. The integrated composite router of claim 8,
wherein the second leaf network device comprises an egress table,
wherein the egress table comprises a plurality of egress table entries,
wherein one of the plurality of egress table entries comprises an egress MAC address and specifies an egress interface,
wherein the second MAC address is the egress MAC address,
wherein the first interface of the second network device is the egress interface, and
wherein sending the second rewritten packet from the first interface on the second network device comprises using the egress table and the second MAC address to identify the one of the plurality of egress table entries.

17. The integrated composite router of claim 8, wherein the second network device further comprises a MAC pointer table, wherein the MAC pointer table comprises a MAC pointer table entry, and wherein the MAC pointer table entry comprises the destination MAC address of the first rewritten packet and a pointer to an instruction that enables the rewriting of destination MAC addresses of packets.

18. The integrated composite router of claim 8, further configured to:
receive a new route from the first external network device;
identify a leaf network device that comprises the non-overlapping portion of the routing table in which to store the route;
store the new route in the identified leaf device.

19. A non-transitory computer readable medium comprising instructions, which when executed by a processor, perform a method for routing packets, the method comprising:
receiving, at an interface of a first network device of a plurality of network devices in a leaf tier, a first packet, wherein the first packet comprises a first destination Internet Protocol (IP) address and wherein each of the plurality of network devices comprises a supernet table and a non-overlapping portion of a routing table;

determining, using the first destination IP address and the supernet table, a first IP address of a second network device to which the packet is to be sent, wherein the second network device is one of the plurality of network devices in the leaf tier, wherein the supernet table comprises a plurality of entries, wherein each of the plurality of entries comprises a non-overlapping IP address range and specifies a corresponding one of the plurality of network devices in the leaf tier, and wherein the non-overlapping portion of the routing table on the second network device comprises a route for the first packet;

determining, by the first network device, a first media access control (MAC) address of the second network device using the first IP address;

rewriting, by the first network device, the first packet to obtain a first rewritten packet, wherein the first rewritten packet comprises the first MAC address as a destination MAC address of the first rewritten packet and the first destination IP address;

sending the first rewritten packet to a third network device, wherein the third network device is not in the leaf tier;

determining, by the third network device using the destination MAC address of the first rewritten packet, to forward the first rewritten packet from the third network device to the second network device;

sending the first rewritten packet to the second network device;

performing, by the second network device using the destination MAC address of the first rewritten packet, a first MAC pointer table lookup to determine that a first routing table lookup is to be performed using the first destination IP address of the first rewritten packet;

performing, by the second network device, the first routing table lookup, wherein the first routing table lookup comprises using the non-overlapping portion of the routing table on the second network device to determine a second IP address corresponding to a first external network device to which the packet is to be sent;

determining, by the second network device, a second MAC address of the first external network device using the second IP address;

rewriting the first rewritten packet to obtain a second rewritten packet, by the second network device using the second MAC address, wherein the second rewritten packet comprises the second MAC address as a destination MAC address of the second rewritten packet and the first destination IP address;

sending the second rewritten packet from a first interface on the second network device to the first external network device, wherein the first interface is associated with the second MAC address.

20. The non-transitory computer readable medium of claim 19, further comprising:

receiving, at the interface of the first network device, a second packet, wherein the second packet comprises a second destination IP address;

performing, by the first network device, a second routing table lookup, wherein the second routing table lookup comprises using the non-overlapping portion of the routing table on the first network device to determine a third IP address corresponding to a second external network device to which the second packet is to be sent;

determining, by the first network device using the third IP address, a third MAC address corresponding to the second network device;

rewriting the second packet to obtain a third rewritten packet, wherein the third rewritten packet comprises the third MAC address as the destination MAC address of the third rewritten packet and the second destination IP address;

sending the third rewritten packet to the third network device;

determining, by the third network device using the destination MAC address of the third rewritten packet, to forward the third rewritten packet from the third network device to the second network device;

sending the third rewritten packet to the second network device;

performing, by the second network device using the destination MAC address of the third rewritten packet, a second MAC pointer table lookup to determine a fourth MAC address corresponding to the second external network device;

rewriting the third rewritten packet to obtain a fourth rewritten packet, wherein the fourth rewritten packet comprises the fourth MAC address as the destination MAC address of the fourth rewritten packet and the second destination IP address;

sending the fourth rewritten packet from a second interface of the second network device, wherein the second interface of the second network device is associated with the fourth MAC address.

\* \* \* \* \*